(12) United States Patent
Matsuki et al.

(10) Patent No.: US 7,452,143 B2
(45) Date of Patent: Nov. 18, 2008

(54) ELECTROSTATIC ACTUATOR, SHUTTER DEVICE, IMAGING MODULE, AND CAMERA

(75) Inventors: Kaoru Matsuki, Akishima (JP); Shinji Kaneko, Kokubunji (JP); Tsuyoshi Togawa, Hachioji (JP); Sumio Kawai, Hachioji (JP)

(73) Assignee: Olympus Corporation, Tokyo (JP)

( * ) Notice: Subject to any disclaimer, the term of this patent is extended or adjusted under 35 U.S.C. 154(b) by 86 days.

(21) Appl. No.: 11/351,101

(22) Filed: Feb. 9, 2006

(65) Prior Publication Data
US 2006/0127085 A1 Jun. 15, 2006

Related U.S. Application Data

(63) Continuation of application No. PCT/JP2004/011621, filed on Aug. 12, 2004.

(30) Foreign Application Priority Data

| Aug. 21, 2003 | (JP) | ............................. 2003-297735 |
| Sep. 30, 2003 | (JP) | ............................. 2003-342086 |
| Nov. 6, 2003 | (JP) | ............................. 2003-377185 |
| Aug. 2, 2004 | (JP) | ............................. 2004-225901 |

(51) Int. Cl.
*G03B 9/40* (2006.01)
(52) U.S. Cl. ..................................... 396/484
(58) Field of Classification Search ................. 396/471, 396/483–489, 491
See application file for complete search history.

(56) References Cited

U.S. PATENT DOCUMENTS

| 5,761,552 | A | 6/1998 | Goto et al. |
| 6,353,276 | B1 * | 3/2002 | Gendron ..................... 310/309 |
| 2002/0172619 | A1 | 11/2002 | Moon et al. |

FOREIGN PATENT DOCUMENTS

| JP | 49-58341 | 5/1974 |
| JP | 61-201031 | 12/1986 |
| JP | 2-39031 | 2/1990 |
| JP | 4-112683 | 4/1992 |
| JP | 5-36430 | 2/1993 |
| JP | 5-341350 | 12/1993 |
| JP | 05341350 A * | 12/1993 |

(Continued)

OTHER PUBLICATIONS

Chinese Office Action for Chinese Patent Application No. 200480023950.0, mailed on May 9, 2008 (13 pgs.) (with English Translation (19 pgs.)).

*Primary Examiner*—W. B. Perkey
*Assistant Examiner*—Rishi S Suthar
(74) *Attorney, Agent, or Firm*—Straub and Pokotylo; John C. Pokotylo

(57) ABSTRACT

A shutter device comprising a fixed member which has a plurality of electrodes arranged on a surface, a light-transmitting region which is provided in the fixed member, a light-shielding member which is able to move between two positions where the light-transmitting region is closed and opened, respectively, and which have a plurality of electret parts, and a drive circuit which periodically applies a voltage to the electrodes provided on the fixed member, thereby to generate an electrostatic force acting on the electret parts of the light-shielding member and to drive the light-shielding member.

6 Claims, 29 Drawing Sheets

FOREIGN PATENT DOCUMENTS

| | | |
|---|---|---|
| JP | 7-123743 | 5/1995 |
| JP | 8-220592 | 8/1996 |
| JP | 9-129859 | 5/1997 |
| JP | 2660125 | 6/1997 |
| JP | 11-15052 | 1/1999 |
| JP | 11-218838 | 8/1999 |
| JP | 2000-39550 | 2/2000 |
| JP | 3351568 | 9/2002 |
| JP | 2002-341400 | 11/2002 |

* cited by examiner

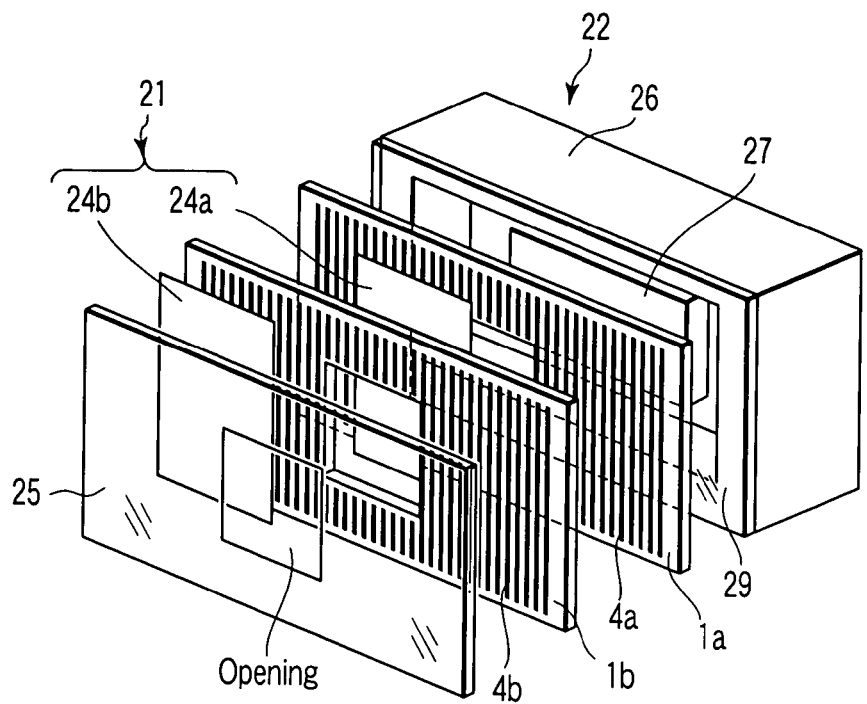
F I G. 5
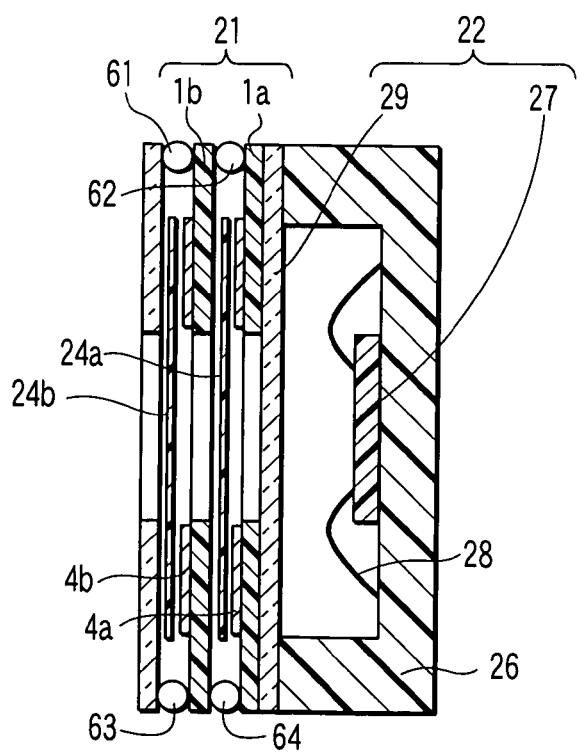
F I G. 6

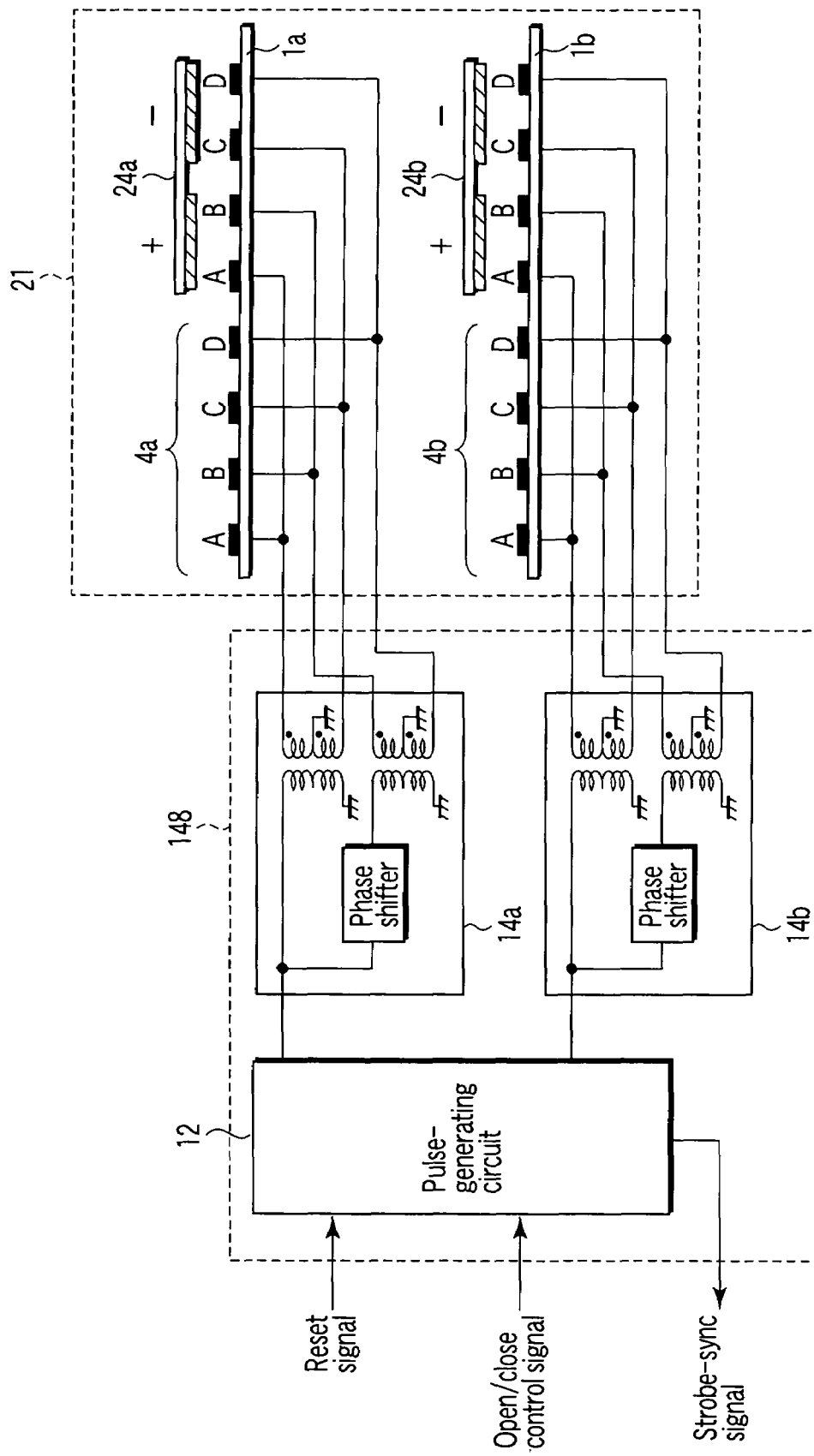
F I G. 9

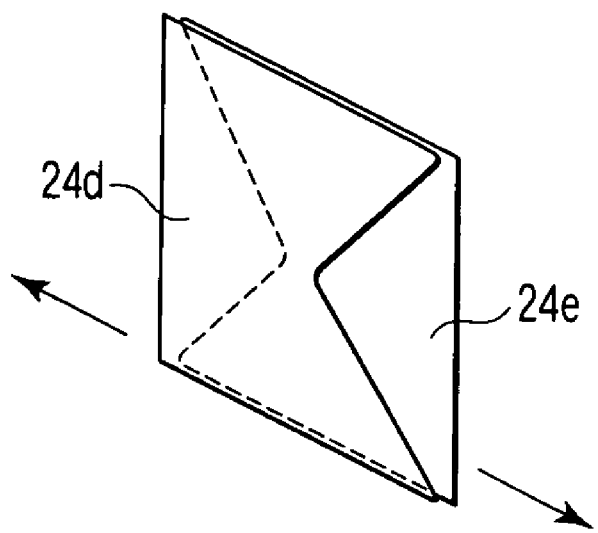
F I G. 13A
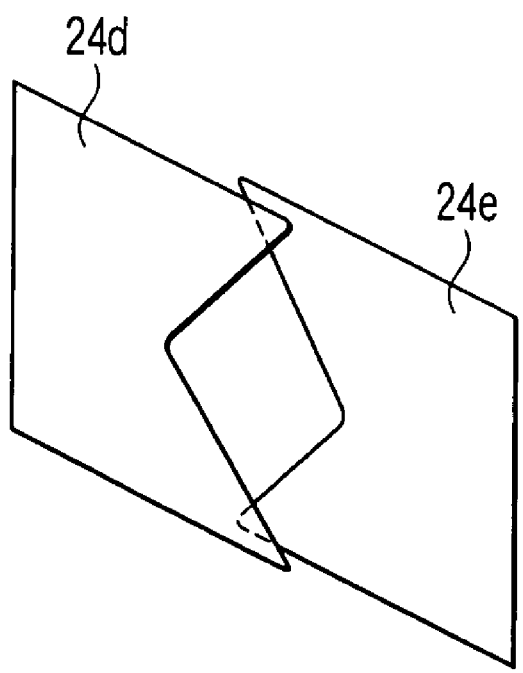
F I G. 13B

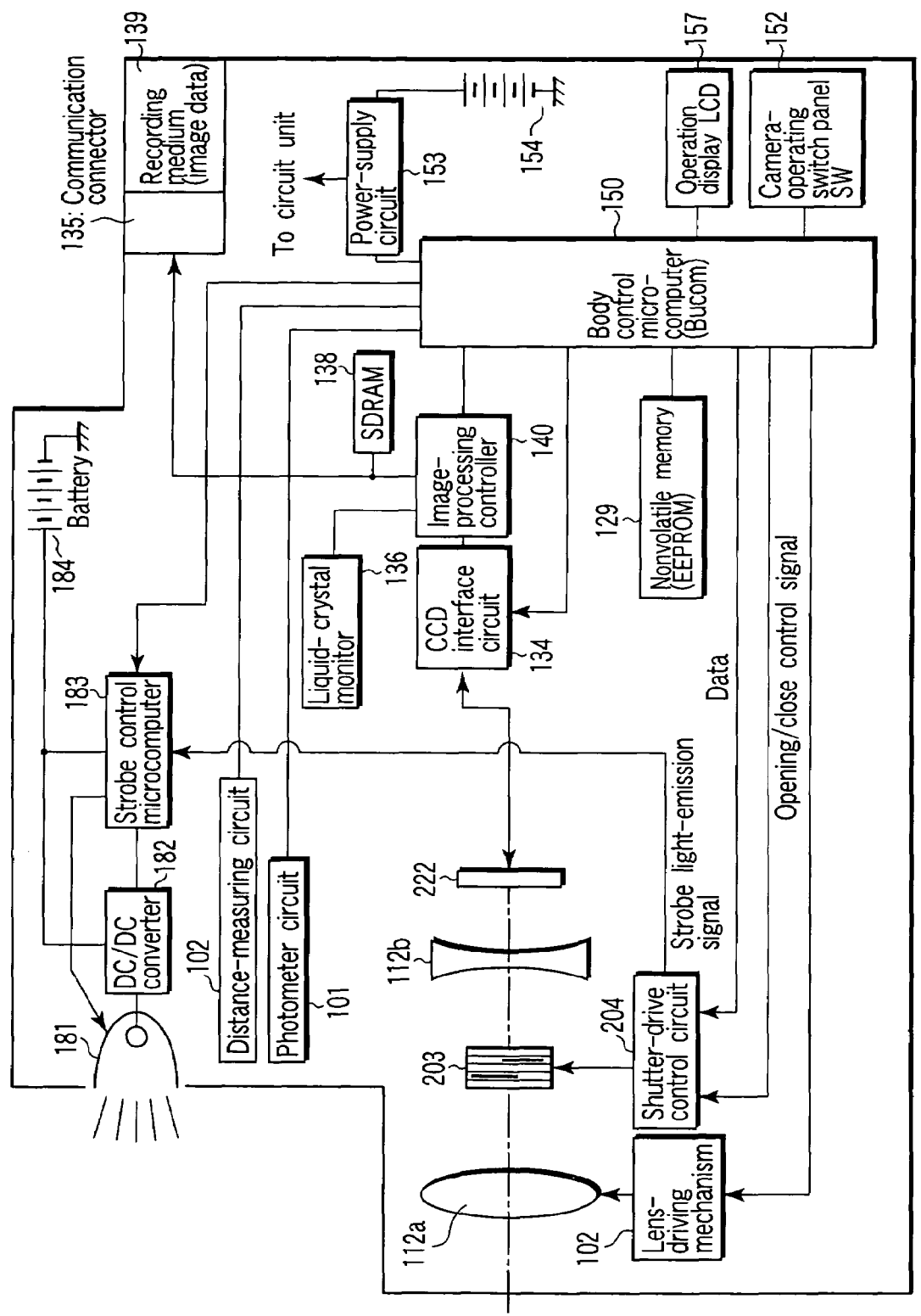
F I G. 14

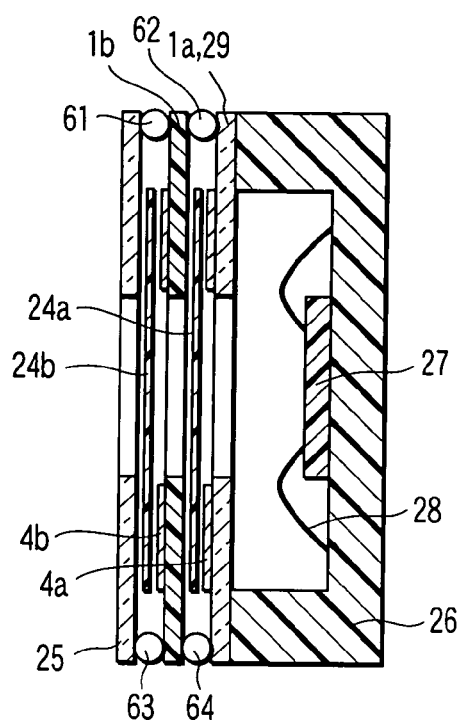
F I G. 18
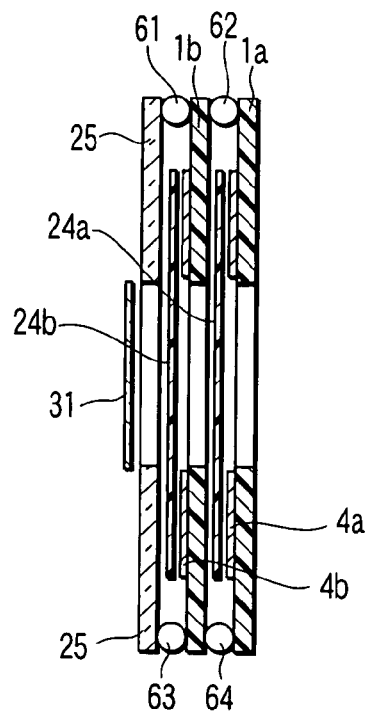
F I G. 19

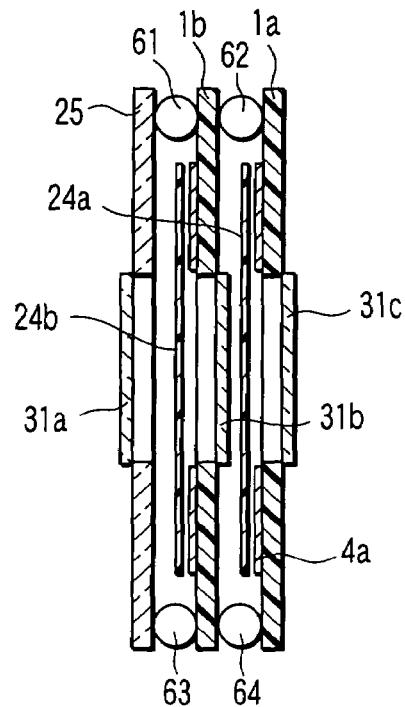
F I G. 20
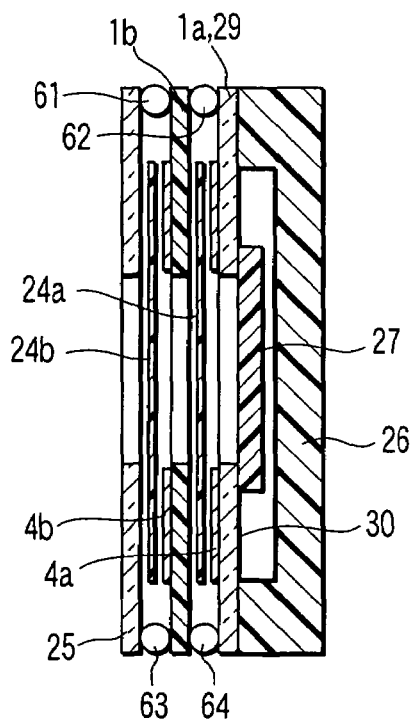
F I G. 21

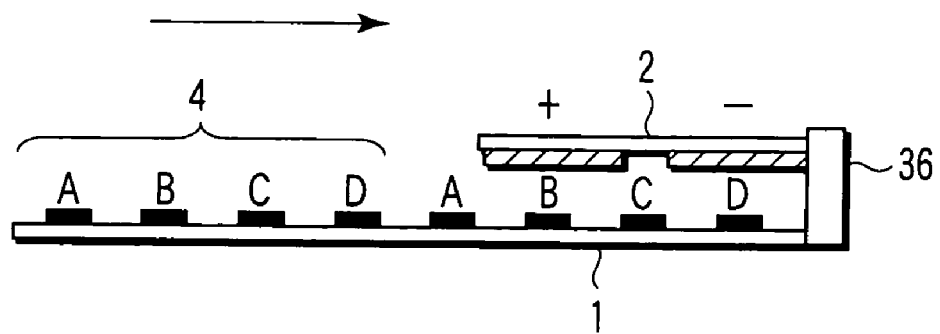
F I G. 24
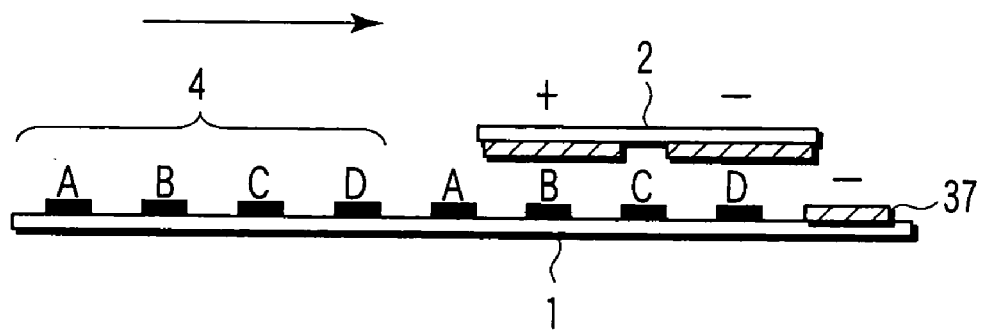
F I G. 25

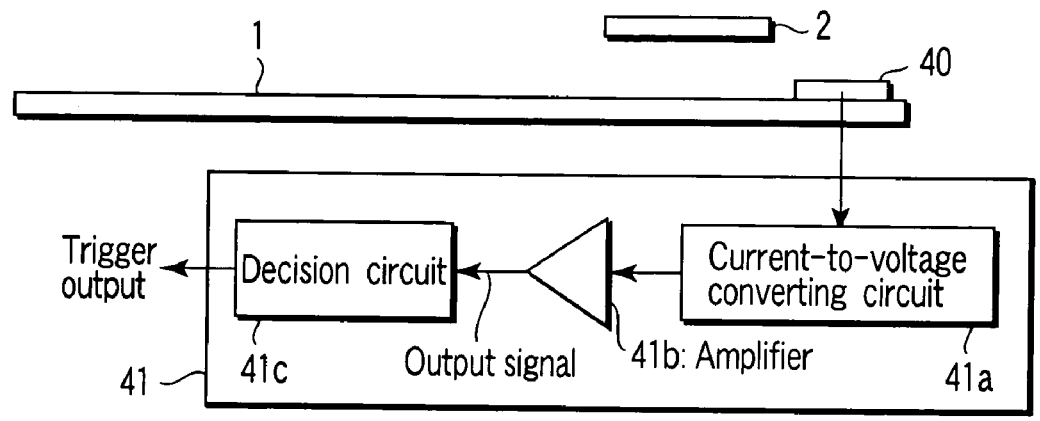
F I G. 29
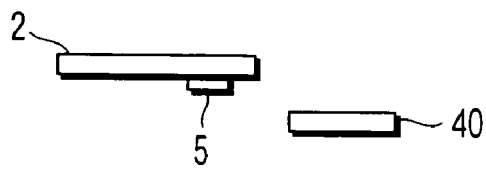
F I G. 30A
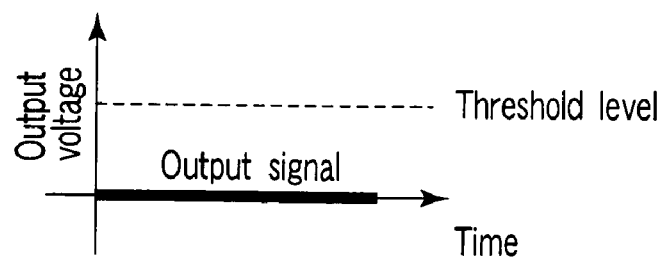
F I G. 30B

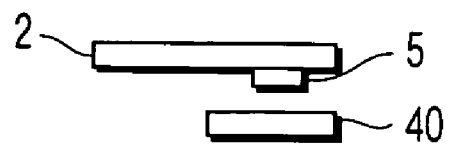
F I G. 31A
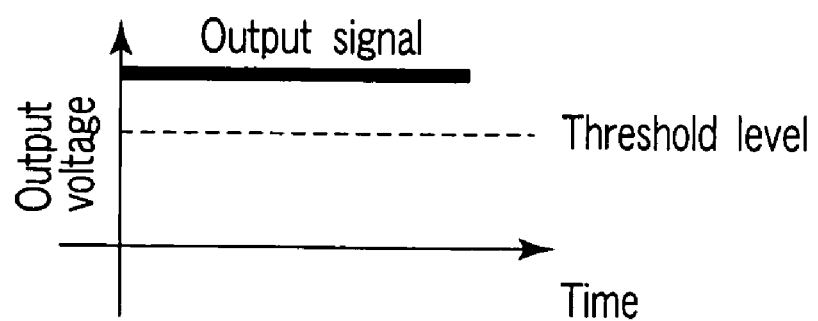
F I G. 31B

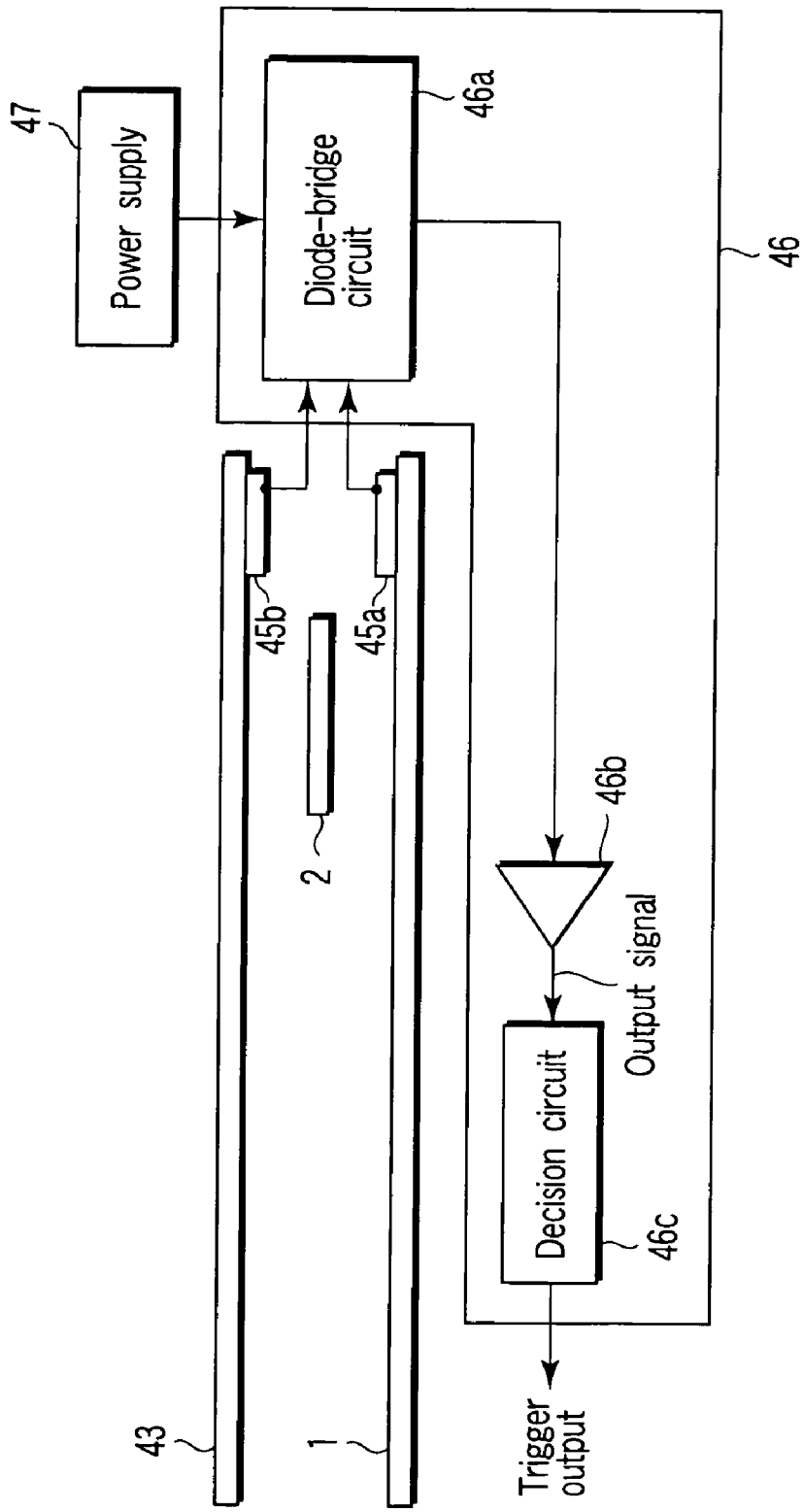
F I G. 33

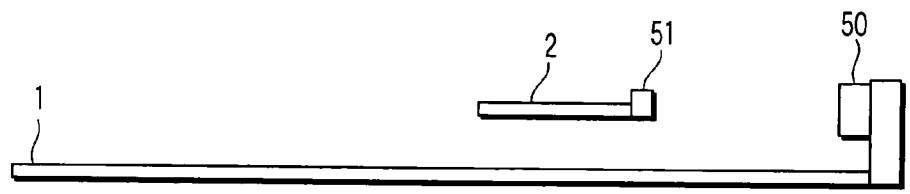
F I G. 34A
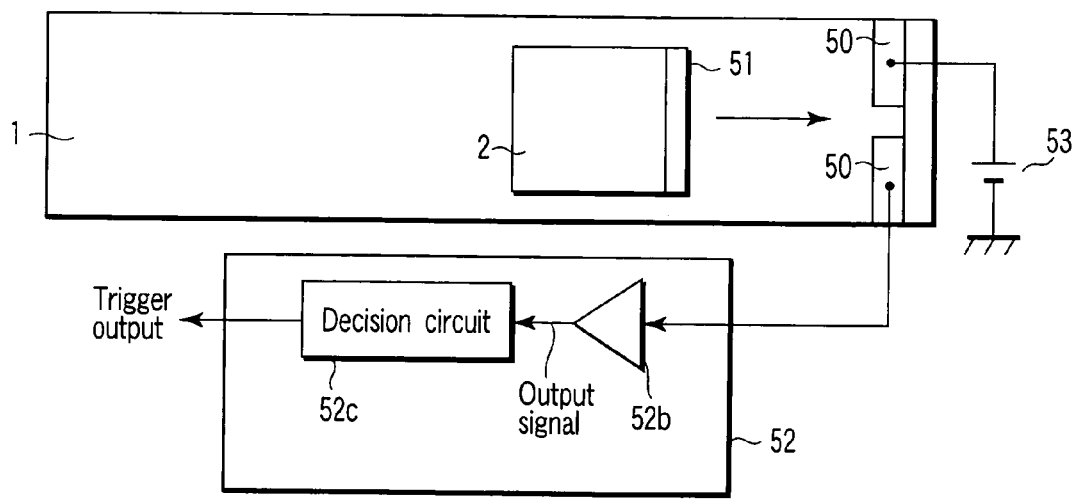
F I G. 34B

ELECTROSTATIC ACTUATOR, SHUTTER DEVICE, IMAGING MODULE, AND CAMERA

CROSS-REFERENCE TO RELATED APPLICATIONS

This is a Continuation Application of PCT Application No. PCT/JP2004/011621, filed Aug. 12, 2004, which was published under PCT Article 21(2) in Japanese.

This application is based upon and claims the benefit of priority from prior Japanese Patent Applications No. 2003-297735, filed Aug. 21, 2003; No. 2003-342086, filed Sep. 30, 2003; No. 2003-377185, filed Nov. 6, 2003; and No. 2004-225901, filed Aug. 2, 2004, the entire contents of all of which are incorporated herein by reference.

BACKGROUND OF THE INVENTION

1. Field of the Invention

The present invention relates to an electrostatic actuator that uses an electret as movable member, a shutter device that has the electrostatic actuator, an imaging module that has the shutter device, and a camera that has the shutter device.

2. Description of the Related Art

In recent years, digital cameras having a solid-state imaging element that converts an optical image of an object into electronic data have come into widespread use in various apparatuses such as mobile telephones, portable terminal apparatuses, watches, peripheral terminals of data-processing apparatuses and digital household appliance. In this trend, it is demanded that the digital camera should perform various functions.

First, it is demanded that the camera body should be thin and light.

The following two techniques are known, which make the camera body thin.

One of the techniques is to protrude the glass cover of the imaging unit incorporating the imaging element, into the shutter unit, thereby to render the camera body thin (see Jpn. Pat. Appln. KOKAI Publication No. 11-218838). The other technique is to combine the imaging element and the luminous energy adjusting plate, thus making the imaging unit thinner (see Jpn. Pat. Appln. KOKAI Publication No. 9-129859).

Secondly, it is demanded that the stroboscopic tube should be controlled with high precision.

When the camera performs strobe photographing, the stroboscopic tube light in synchronism with the full opening of the shutter. The stroboscopic tube should therefore be controlled to emit light at the very time when the shutter operates at high speed.

The following two techniques are known, which control the light-emission timing of the stroboscopic tube with high precision.

One of these techniques is to use a control means that calculates the time when the stroboscopic tube should emit light, from the time when the means for monitoring the motion of the shutter blade detects that the shutter blade starts moving (see Jpn. Pat. Appln. KOKAI Publication No. 11-15052).

The other technique is to count the drive pulses supplied to the stepping motor that drive the shutter blade, and to make the stroboscopic tube to emit light in accordance with the resultant count value (see Jpn. Pat. Appln. KOKAI Publication No. 5-36430). Thirdly, it is demanded that the shutter mechanism should be light and operate at high speed.

A technique known as meeting this demand is to use an electrostatic actuator that has an electret employed as movable member. The movable member of the electrostatic actuator can be made lighter and can thus be moved at higher speed (see Jpn. Pat. Appln. Publication No. 4-112683).

BRIEF SUMMARY OF THE INVENTION

An electrostatic actuator according to an aspect of the invention comprises a fixed member which has a plurality of driving electrodes arranged on a surface; a movable member which is able to move with respect to the fixed member and which has a plurality of electret parts; a protective member which is so arranged that the movable member lies between the fixed member and the protective member; a pulse-generating circuit which outputs a drive pulse signal for driving the movable member; a drive circuit which applies a multi-phase AC voltage to the driving electrodes in accordance with the drive pulse signal output from the pulse-generating circuit; and a mechanical or electric stopper which is arranged on the fixed member and located at a position corresponding to an initial position of the movable member. The pulse-generating circuit generates an initializing pulse signal for driving the movable member until the movable member reaches the stopper after power is supplied to the electrostatic actuator.

A shutter device according to another aspect of the invention, comprises: a fixed member which has a plurality of electrodes arranged on a surface; a light-transmitting region which is provided in the fixed member; a light-shielding member which is able to move between two positions where the light-transmitting region is closed and opened, respectively, and which have a plurality of electret parts; and a drive circuit which periodically applies a voltage to the electrodes provided on the fixed member, thereby to generate an electrostatic force acting on the electret parts of the light-shielding member and to drive the light-shielding member.

An imaging module according to still another aspect of the invention is an imaging module including an imaging element and a shutter device which adjusts, in amount, light to the imaging element. The shutter device comprises: a first fixed member and a second fixed member, each having a plurality of electrodes arranged on a surface; a first light-transmitting region and a second light-transmitting region, which are provided in the first fixed member and the second fixed member, respectively; a first light-shielding member and a second light-shielding member, the first light-shielding member being able to move between two positions where the first light-transmitting region is closed and opened, respectively, and the second light-shielding member being able to move between two positions where the second light-transmitting region is closed and opened, respectively; and a drive circuit which periodically applies a voltage to the electrodes provided on the first and second fixed members, thereby to drive the first and second light-shielding members independently, with an electrostatic force, and the imaging element is arranged at a reverse surface of the second fixed member.

A camera according to a further aspect of the invention comprises: a shutter fore-shield which has electret parts and which is located in an incident-light path in an initial state; a first electrode member which has a plurality of scanning electrodes arranged in alignment with the electret parts of the shutter fore-shield; a shutter aft-shield which has electret parts and which is located outside the incident-light path in the initial state; a second electrode member which has a plurality of scanning electrodes arranged in alignment with the electret parts of the shutter aft-shield; drive control means for performing a first electrostatic drive operation of moving the shutter fore-shield from the incident-light path, by controlling a multi-phase AC voltage applied to the scanning electrodes of the first electrode member, a second electrostatic drive operation of moving the shutter aft-shield into the incident-light path, by controlling a multi-phase AC voltage applied to the scanning electrodes of the second electrode member, and a third electrostatic drive operation of moving the shutter fore-shield and the shutter aft-shield back to initial positions, respectively; signal-outputting means for outputting a strobe-sync signal when the first electrostatic operation is performed; and a stroboscopic device which emits light in response to the strobe-sync signal.

BRIEF DESCRIPTION OF THE SEVERAL VIEWS OF THE DRAWING

FIG. 5 is a perspective view showing the structure of the imaging module used in a first embodiment of a shutter device according to the present invention;

FIG. 6 is a sectional view of the first embodiment of an imaging module according to the invention;

FIG. 9 is a diagram illustrating how signals are supplied from the shutter-drive control circuit to the shutter unit;

FIG. 13A is a diagram depicting the structure of the optical shields and explains the operation thereof;

FIG. 13B is another diagram depicting the structure of the optical shields and explains the operation thereof;

FIG. 14 is a block diagram showing the system configuration of a camera that has the shutter device according to a second embodiment of the invention;

FIG. 18 is a sectional view of a second embodiment of the imaging module according to this invention;

FIG. 19 is a sectional view showing the structure of the shutter unit provided in a third embodiment of the imaging module according to the invention;

FIG. 20 is a sectional view of the structure of the shutter unit provided in a fourth embodiment of the imaging module according to this invention;

FIG. 21 is a sectional view depicting the structure of a fifth embodiment of the imaging module according to the invention;

FIG. 24 is a diagram showing the structure of an electrostatic actuator that has a mechanical stopper;

FIG. 25 is a diagram showing the structure of an electrostatic actuator that has an electric stopper;

FIG. 29 is a diagram depicting the structure of an electrostatic actuator that has a detection electrode;

FIG. 30A is a diagram explaining how the detection electrode performs its function;

FIG. 30B is a diagram explaining how the detection electrode performs its function;

FIG. 31A is a diagram explaining how the detection electrode performs its function;

FIG. 31B is a diagram explaining how the detection electrode performs its function;

FIG. 33 is a diagram showing the structure of an electrostatic actuator;

FIG. 34A is a diagram showing the structure of an electrostatic actuator; and

FIG. 34B is a diagram showing the structure of an electrostatic actuator.

DETAILED DESCRIPTION OF THE INVENTION

Figure 1A:
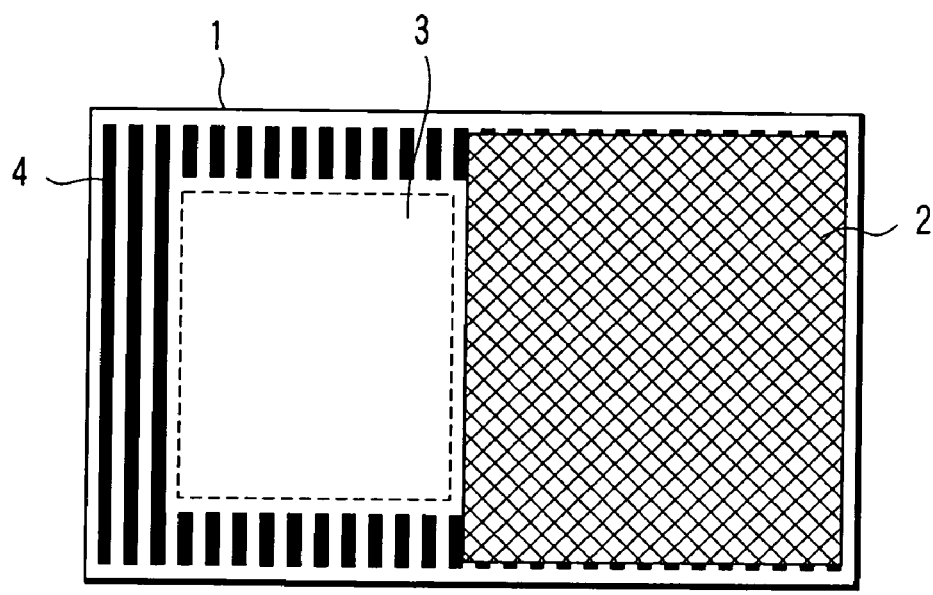
FIG. 1A is a diagram showing the shutter mechanism of a shutter device according to the present invention.
Figure 1B:
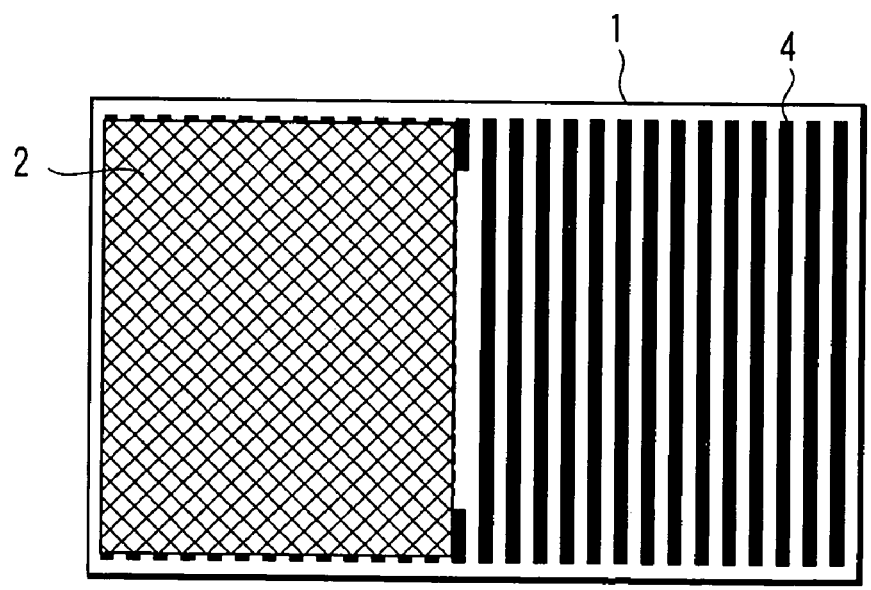
FIG. 1B is a diagram depicting the shutter mechanism of the shutter device according to the invention.

First, it will be described how the shutter mechanism is driven in a shutter device according to this invention, with reference to FIG. 1A, and FIG. 1B and FIG. 2.

The shutter mechanism comprises a fixed member 1 and a movable member 2. The movable member 2 is configured to move to the left and the right, with respect to the fixed member 1. The fixed member 1 has an opening 3 through which the optical image of an object is guided to an imaging element (not shown). On the fixed member 1, a plurality of strip-shaped drive electrodes 4 are arranged at prescribed intervals. The movable member 2 can shield light. It has a plurality of permanently polarized dielectric elements (hereinafter referred to as "electrets"), which will be described later.

When a voltage of a specific frequency is applied to the drive electrodes 4 in this configuration, an attraction or repulsion develops between the electrodes 4 and the electrets. As a result, the movable member 2 moves relative to the fixed member 1.

Thus, a shutter mechanism can be constituted if the movable member 2 can move to open and close the opening 3 of the fixed member 1. FIG. 1A shows the shutter in the opened state. FIG. 1B depicts the shutter in the closed state.

The fixed member 1 need not have the opening 3 if it is a light-transmitting member. In this case, the light-transmitting member has parts on which no drive electrodes 4 are provided. These parts, or light-emitting regions, shall be hereinafter called "openings", for the sake of convenience. The shutter mechanism of this configuration shall be referred to as "electret shutter".

Figure 2:
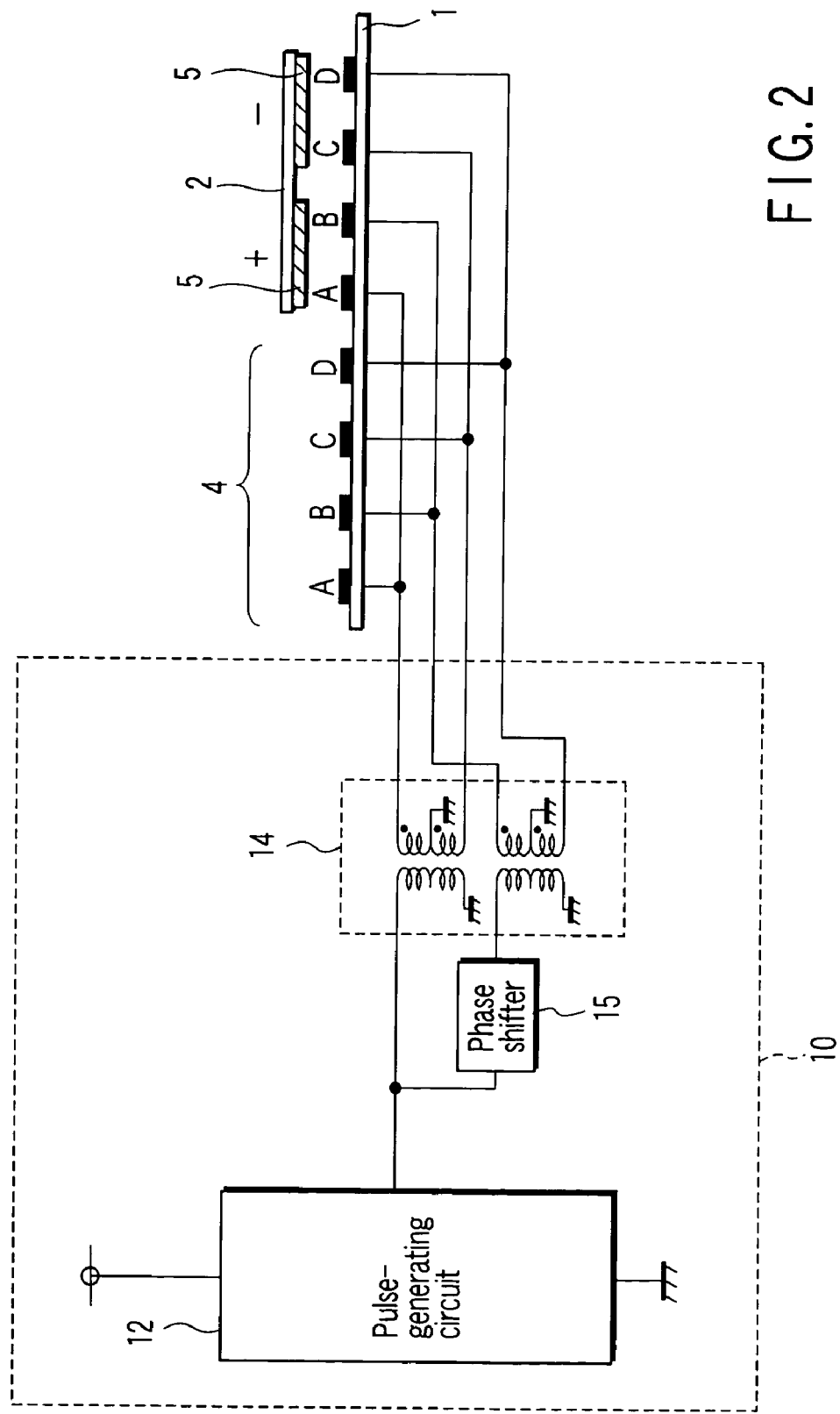
FIG. 2 is a diagram representing the basic configuration of an electret shutter.

The right part of FIG. 2 is a schematic sectional view of the electret shutter. Voltage-signal lines extending from a drive circuit 10 are connected to the drive electrodes 4 that are arranged on the fixed member 1. Through the voltage-signal lines, 4-phase voltage signals are supplied. Hence, the same voltage signal is supplied to every fourth drive electrode 4. In FIG. 2, the four drive signals of each group are designated as A, B, C and D, so that the voltage signals may be distinguished from one another.

A plurality of permanently polarized dielectric elements (electrets) 5 are provided on that surface of the movable member 2, which faces the fixed member 1.

This diagram is schematic at all. In the actual electret shutter, the electrodes and electrets may be laid at specific positions, provided in particular numbers and arranged at appropriate intervals, all determined by various factors. Among these factors are: the size of the shutter mechanism; the area of opening; the polarities of electret parts; the arrangement thereof; the drive resolution required of the shutter mechanism: and the maximum speed of the shutter. This electret shutter of the type in which the electret parts of positive polarity and the electret parts of negative polarity are alternately arranged. Nonetheless, the shutter may be replaced by the type in which the electret parts are either positive or negative in polarity.

Shown in the left part of FIG. 2 is the drive circuit 10 that generates voltage signals to be supplied to the electret shutter. In the drive circuit 10, the pulse-generating circuit 12 generates a rectangular-wave train (drive pulse signal), which is supplied to the booster circuit 14 and the phase shifter 15. The booster circuit 14 raises the voltage of the drive pulse signal to about 100 V and divides the train into two voltage signals, one having positive polarity and the other having negative polarity. These voltage signals are supplied to the drive electrodes A and C, respectively.

The rectangular-wave train input to the phase shifter 15 is delayed in phase by 90°. Thereafter, the train is input to the booster circuit 14 and changed to two rectangular-wave trains similar to those described above. The rectangular-wave trains are supplied to the drive electrodes B and C.

Figure 3:
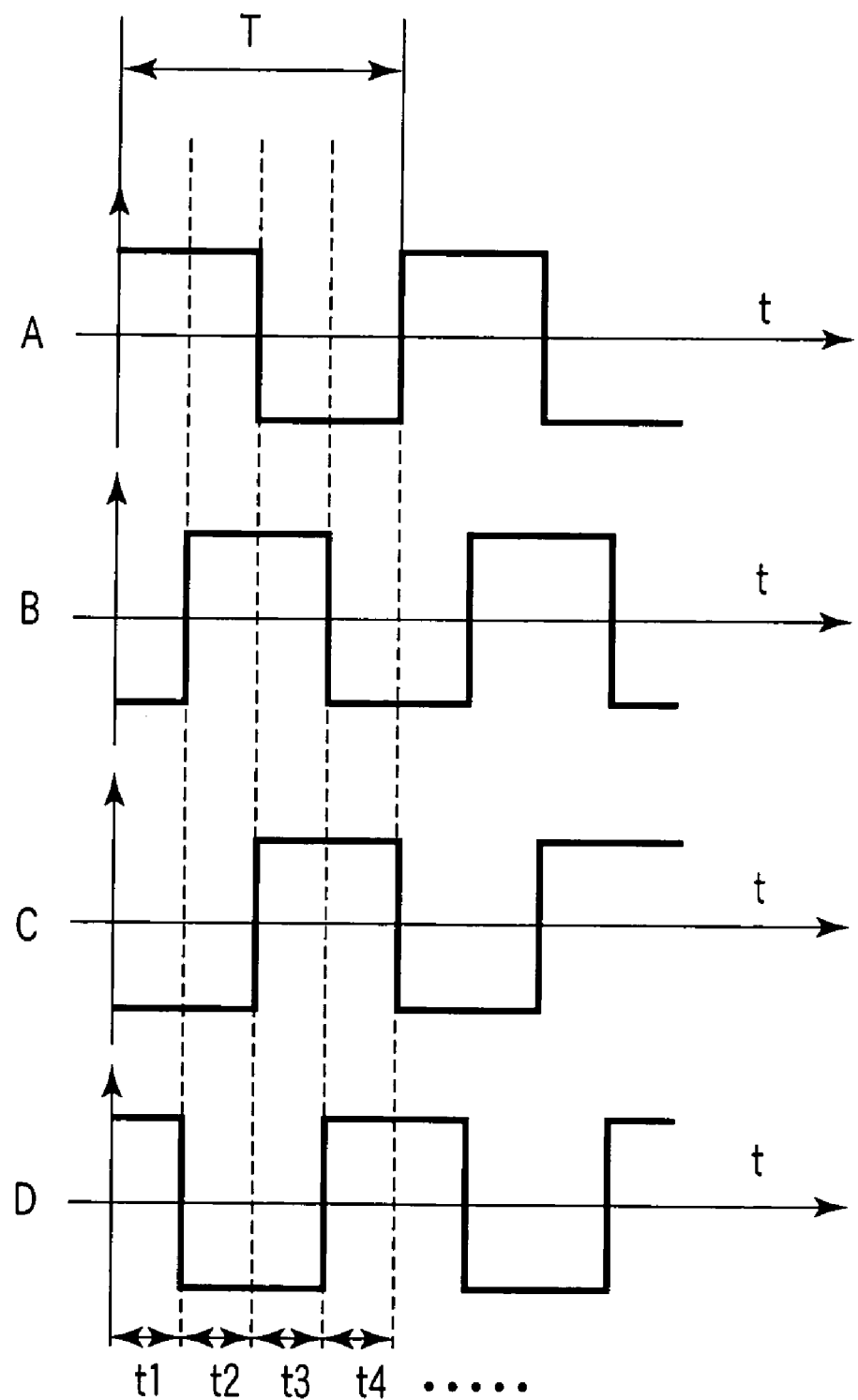
FIG. 3 is a diagram illustrating a train of voltage signals supplied to drive electrodes.

FIG. 3 shows the train of voltage signals, which has been generated by the drive circuit 10 and supplied to the drive electrodes 4. The voltage applied to each drive electrode 4 changes with time, repeatedly taking four different states t1 to t4, one after another.

FIGS. 4A to 4D are diagrams that explain how the electret shutter operates.

Figure 4A:
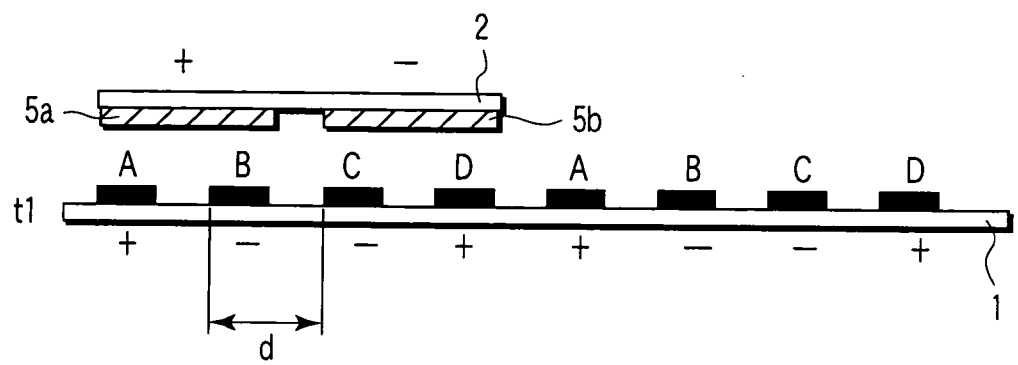
FIG. 4A is a diagram explaining how the electret shutter operates.

FIG. 4A shows the voltages that are applied to the electrets and drive electrodes immediately after the state changes to t1. The electret 5a receives repulsion from the drive electrode A and an attraction from the drive electrode B. The electret 5b receives repulsion from the drive electrode C and an attraction from the drive electrode D. Therefore, the movable member 2 receives a force acting to the right and moves for pitch d of the drive electrodes.

Figure 4B:
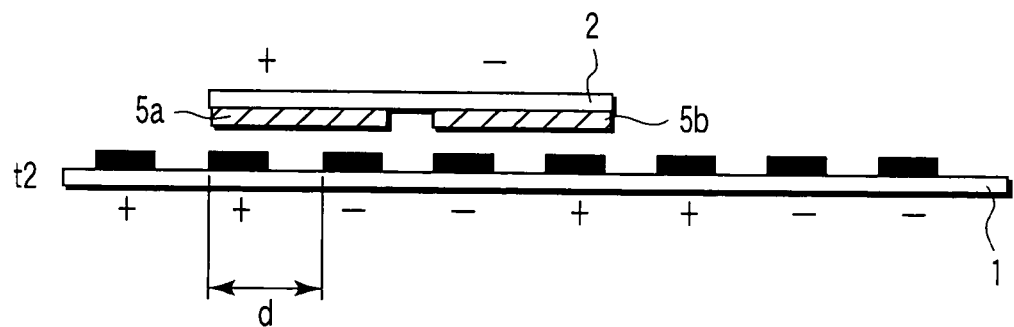
FIG. 4B is a diagram explaining how the electret shutter operates.

FIG. 4B depicts the voltages that are applied to the electrets and drive electrodes immediately after the state changes to t2. The electret 5a receives repulsion from the drive electrode A and an attraction from the drive electrode B. The electret 5b receives repulsion from the drive electrode C and an attraction from the drive electrode D. Thus, the movable member 2 receives a force acting to the right and moves for pitch d of the drive electrodes.

Figure 4C:
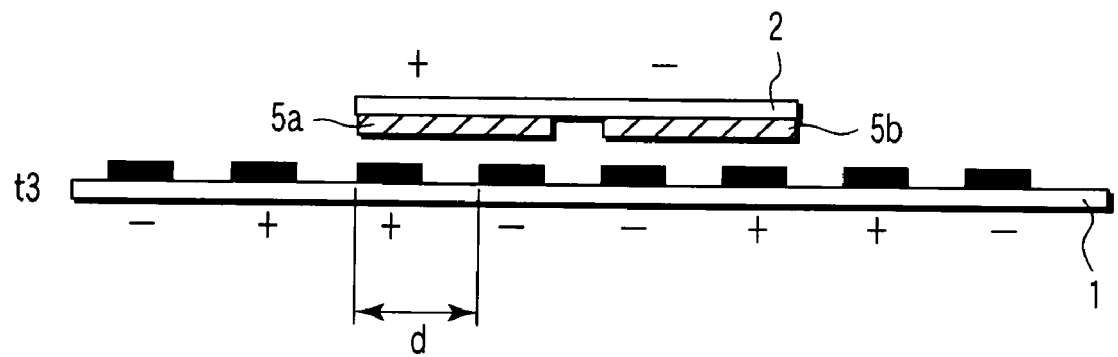
FIG. 4C is a diagram explaining how the electret shutter operates.
Figure 4D:
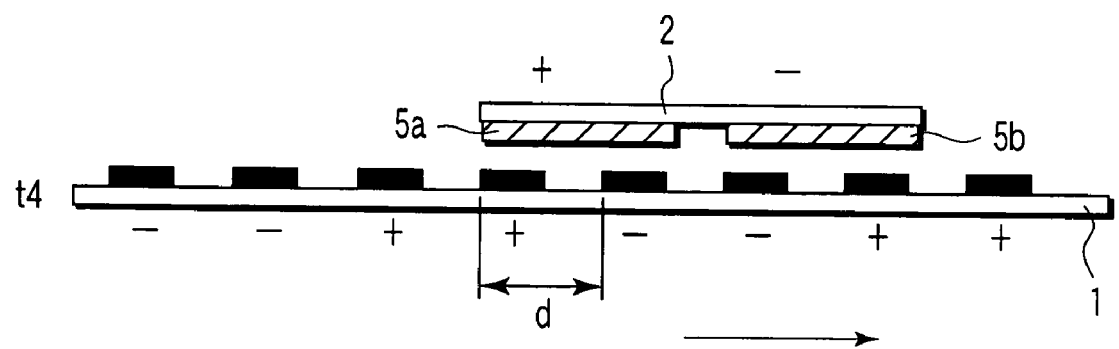
FIG. 4D is a diagram explaining how the electret shutter operates.

FIG. 4C shows the voltages that are applied to the electrets and drive electrodes immediately after the state changes to t3. FIG. 4D shows the voltages that are applied to the electrets and drive electrodes right after the state changes to t4. The movable member 2 moves for pitch d of the drive electrodes, in the same manner as described above. As the operation is repeated, the movable member 2 moves to the right in the drawing. To move the movable member 2 to the left in the drawing, it suffices to switch the polarity of the voltage applied to the drive electrodes 4.

A shutter device according to the present invention will be described.

First Embodiment of the Shutter Device

FIG. 5 is a perspective view that illustrates the structure of the imaging module of a shutter device according to the first embodiment of the invention. FIG. 6 is a sectional view of the imaging module.

The imaging module comprises a shutter unit 21 and an imaging unit 22.

The shutter unit 21 is a focal plane shutter that has an optical shield (fore-shield) 24a and an optical shield (aft-shield) 24b. The optical shields 24a and 24b have an electret 5 (not shown) each. The electret is of the type described above. One electret 5 has a fixed member 1a on one surface. The other electret 5 has a fixed member 1b on the surface that faces said surface of the first-mentioned electret 5. A plurality of drive electrodes 4a are arranged on the fixed member 1a, which has an opening (light-transmitting part). A plurality of drive electrodes 4b are arranged on the fixed member 1b, which has an opening (light-transmitting part). Further, a protective member 25 having an opening (light-transmitting part) is secured, covering the front of the shutter unit 21 and spaced apart therefrom by spacers 61 to 64.

The fixed members 1a and 1b comprise a substrate each, which is a polyimide film. The drive electrodes 4a and 4b are printed on fixed members, respectively, by means of etching. Further, insulating films are provided on the drive electrodes 4a and 4b. The optical shields 24a and 24b comprise a substrate each, which is made of Teflon (registered trademark). Electrets are formed on one surface of each optical shield by means of corona discharging. Thus, electrets are provided.

The imaging unit 22 comprises a housing 26, an imaging element 27, signal lines 28, and a glass cover 29. The element 27 and lines 28 are incorporated and secured in the housing 26. A glass cover 29 having an opening (light-transmitting part) closes that side of the housing 26, which is opposed to an object.

In the imaging module, the shutter unit 21 has an electret shutter. The shutter unit can therefore be much thinner than the conventional shutter unit. It can be very thin.

The electret shutter utilizes the charge permanently polarized in the electrets, not the charge induced in the optical shield 24a or 24b. It can therefore start operating within a short time. Hence, it can perform a high-speed shuttering operation.

The charge can be applied to the electrets at any desired value. An optimal charge can therefore be applied to generate a maximum drive force. This makes it possible to provide an extremely large drive force. Thus constituted, the shutter unit 21 is optimal to the size of the imaging module.

Since the fixed members 1a and 1b and the optical shields 24a and 24b are made of resin, they are light. The optical shields 24a and 24b, for example, can be thin films, each as thin as 10 to 20μ. Hence, the electric power for driving the optical shields is small, and the optical shields can quietly move.

Figure 7A:
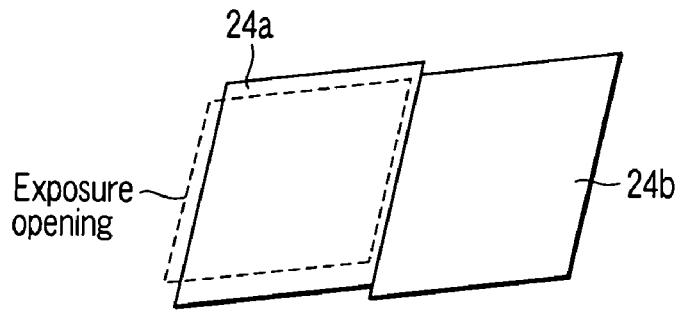
FIG. 7A is a diagram explaining how the optical shield operates.
Figure 7B:
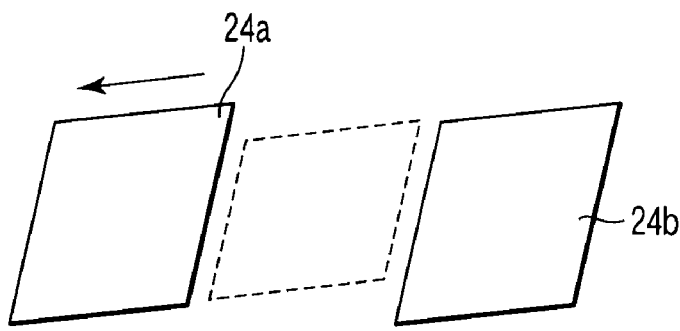
FIG. 7B is another diagram explaining how the optical shield operates.
Figure 7C:
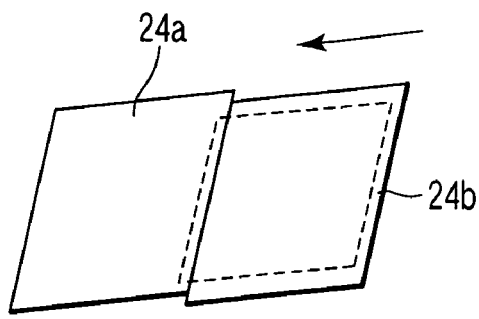
FIG. 7C is still another diagram explaining how the optical shield operates.

FIGS. 7A, 7B and 7C are diagrams explaining how the optical shields 24a and 24b operate.

In the initial state shown in FIG. 7A, the shields are in totally closing position. That is, the fore-shield 24a covers the exposure opening entirely, thus completely shielding the imaging unit 22 from the object. When the photographer releases the shutter, the fore-shield 24a is driven in the direction of the arrow as shown in FIG. 7B, fully opening the exposure opening. The light from the object is thereby guided to the imaging unit 22 through the exposure opening. Upon lapse of a preset exposure time, the aft-shield 24b is driven in the direction of the arrow as illustrated in FIG. 7C, closing the exposure opening.

Thereafter, the fore-shield 24a and the aft-shield 24b resume the initial state. They remain to operate until the photographer releases the shutter next time.

Figure 8:
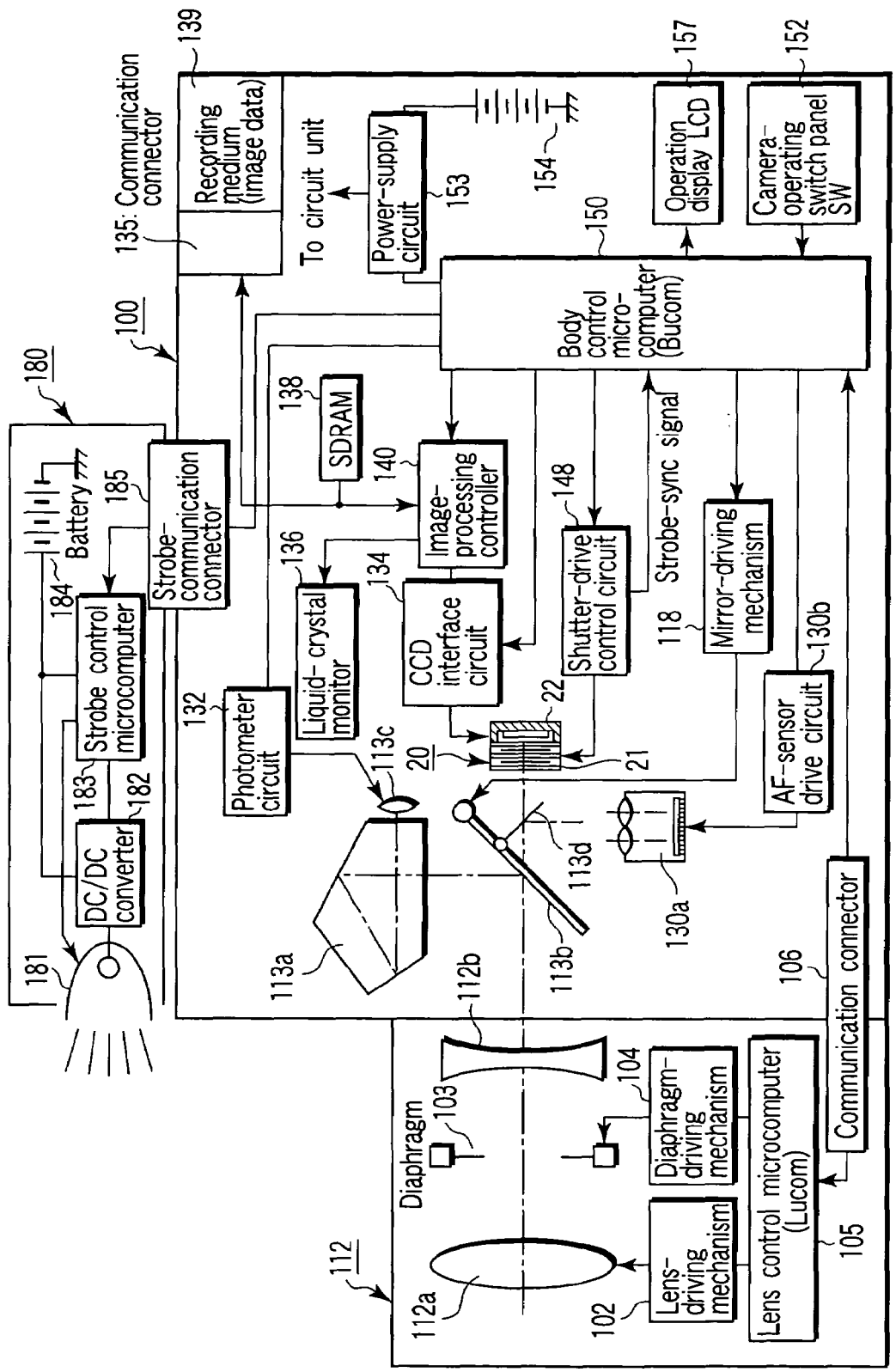
FIG. 8 is a block diagram showing the system configuration of a camera that has the shutter device according to the first embodiment of the invention.

FIG. 8 is a block diagram showing the system configuration of a camera that has the shutter device according to the first embodiment of the invention.

The camera system comprises a body unit 100 and accessory devices. The body unit 100 is the camera body. Among the accessory devices (hereinafter referred to as "accessories") are: a lens unit 112, a recording medium 139, and a stroboscopic unit 80. The lens unit 112 is used as an exchange lens. The recording medium 139 stores image data obtained by photographing. The stroboscopic unit 80 is an externally coupled to the body unit 100.

The lens unit 112 that the user has selected is removably attached to the lens mount (not shown) provided on the front of the body unit 100.

The recording medium 139 is a memory card of a specific type or an external recording medium such as an HDD. It is removably connected to the camera body to exchange data therewith.

The stroboscopic unit 180 comprises a flash bulb 181, a DC/DC converter 182, a strobe control microcomputer 183, and a battery 184. The unit 180 can communicate with the camera body via a strobe-communication connector 185.

The lens unit 112 is controlled by a lens control microcomputer 105 (hereinafter referred to as "Lucom"). The body unit 100 is controlled by a body control microcomputer 150 (hereinafter called "Bucom"). Lucom 105 and Bucom 150 are electrically connected by a communication connector 106, so that they may communicate with each other. Lucom 105 cooperates with Bucom 150 in the camera system, acting as slave to Bucom 150.

The lens unit 112 incorporates a photographing lenses 112a and 112b and a diaphragm 103. The photographing lens 112a is driven by the DC motor (not shown) that is provided in a lens-driving mechanism 102. The diaphragm 103 is driven by the stepping motor (not shown) that is provided in a diaphragm-driving mechanism 104. Lucom 105 controls these motors in accordance with the instructions supplied from Bucom 150.

The body unit 100 incorporates various components as shown in FIG. 8. For example, an optical system, an imaging module 20, and an AF sensor unit 130a are provided in the body unit 100. The optical system has components of single-lens reflex type (i.e., penta-prism 113a, quick-return mirror 113b, objective lens 113c and sub-mirror 113d). The AF sensor unit 130a is designed to receive the light reflected from the sub-mirror 113d and performs automatic distance measuring. The imaging module 20 has the shutter unit 21 and the imaging unit 22. The shutter unit 21 is of focal-plane type and provided on the optical axis. The imaging module 22 incorporates a CCD that performs photoelectric conversion on an object image coming through the optical system.

The body unit 100 further incorporates an AF-sensor drive circuit 130b, a mirror-driving mechanism 118, a shutter-drive control circuit 148, and a photometer circuit 132. The AF-sensor drive circuit 130b drives and controls the AF sensor unit 130a. The mirror-driving mechanism 118 drives and controls the quick-return mirror 113b. The shutter-drive control circuit 148 controls the motion of the fore-shield 24a and aft-shield 24b. The photometer circuit 132 receives a light flux from the penta-prism 113a and measures the luminous intensity of the flux.

The shutter-drive control circuit 148 receives and supplies signals for opening and closing the shutter and signals synchronous with the operation of the stroboscopic tube, to and from Bucom 150.

The camera system has a CCD interface circuit 134, a liquid-crystal monitor 136, and an image-processing controller 140. The CCD interface circuit 134 is connected to the imaging unit 22. The image-processing controller 140 uses a SDRAM 138 and the recording medium 139, to process image data. The camera system can therefore perform electro-photographing and can record and display electronic data.

To Bucom 150 there are connected an operation-displaying LCD 157 and a camera-operating switch panel SW 152. The LCD 157 displays data, informing the user of the operating state of the camera. The switch panel SW 152 has various switches including buttons that may be pushed to operate the camera. Among the switches are a release SW, a mode-changing SW, and a power switch. Moreover, a power-supply circuit 153 is connected to Bucom 150. A battery 154 is connected to the power-supply circuit 153. The circuit 153 converts the power of the battery 154 to various voltages that should be applied to the circuit units provided in the camera system.

The camera system thus configured operates as will be described below.

The mirror-driving mechanism 118 is designed to drive the quick-return mirror 113b to UP position and DOWN position. While the quick-return mirror 113b remains at DOWN position, it splits the flux coming through the photographing lenses 112a and 112b, into two beams. These fluxes are guided to the AF sensor unit 130a and the quick-return mirror 113b, respectively.

The output of the AF sensor provided in the AF sensor unit 130a is transmitted to Bucom 150 via the AF-sensor drive circuit 130b. Bucom 150 carries out a distance-measuring process of the known type.

The user can observe the image of the object through the objective lens 113c that is located adjacent to the penta-prism 113a. Part of the flux that has passed through the penta-prism 113a is guided to the photosensor (not shown) that is provided in the photometer circuit 132. The photometer circuit 132 performs a photometric process of the known type, from the luminous intensity that the photosensor has detected.

The shutter-drive control circuit 148 receives from Bucom 150 a signal for drive-controlling the shutter and controls the shutter unit 21 in accordance with this signal. The circuit 148 then outputs a strobe-sync signal, which causes Bucom 150 to make the stroboscopic unit 180 emit light. In accordance with the strobe-sync signal, Bucom 150 outputs a light-emission command signal, which is transmitted to the stroboscopic unit 80.

The image-processing controller 140 controls the CCD interface circuit 134 in accordance with the command given by Bucom 150 and acquires image data from the imaging unit 22. The image-processing controller 140 converts the image data into a video signal. The video signal is output to the liquid-crystal monitor 136. The monitor 136 displays the image represented by the video signal. Seeing the image displayed on the liquid-crystal monitor 136, the user can confirm the image he or she has photographed.

The SDRAM 138 is a memory for temporarily storing image data. It is used as a work area in the process of converting the image data. The image data is converted to JPEG data, which is saved in the recording medium 139.

The shutter device according to the first embodiment of the invention comprises the shutter unit 21 and shutter-drive control circuit 148, both shown in FIG. 8.

FIG. 9 is a diagram illustrating how signals are supplied from the shutter-drive control circuit to the shutter unit 21. As indicated above, the shutter unit 21 has the fore-shield 24a and the aft-shield 24b. To drive these optical shields, two drive circuits are provided, which have the configuration shown in FIG. 2.

The pulse-generating circuit 12 drives the fore-shield 24a and aft-shield 24b in accordance with an open or close control signal supplied from Bucom 150, thereby fully opening or fully closing the exposure opening shown in FIG. 7. On receiving a reset signal from Bucom 150, the circuit 12 circuit 12 drives the fore-shield 24a and aft-shield 24b into the initial state. The pulse-generating circuit 12 outputs a strobe-sync signal to Bucom 150 at a predetermined timing.

As stated above, the booster circuits 14a and 14b shown in FIG. 9 constitute a drive means for driving light-shielding films. They apply multi-phase AC voltages to a plurality of scanning electrodes, in accordance with pulse signals sequentially input. Electrostatic forces generated between the scanning electrodes and the parts functioning as electrets drive the light-shielding film. The pulse-generating circuit 12 is a drive-signal supplying means for supplying, to the drive means, pulse signals that dive, for example, the light-shielding films from the position where they completely close the incident-light passage to the position where they completely open the incident-light passage. Bucom 150 is a shutter-controlling means for outputting signals for driving the light-shielding films to the drive-signal supplying means.

The pulse-generating circuit 12 performs another function. It operates as signal-outputting means for outputting a strobe-sync signal after the drive-signal supplying means has output a preset number of pulses.

The shutter-drive control circuit 148, which comprises the booster circuits 14a and 14b and the pulse-generating circuit 12, applies a specific multi-phase AC voltage to the first electrode member, which generates an electrostatic force. The electrostatic force moves the fore-shield from the optical path. Thereafter, the circuit 148 applies a specific multi-phase AC voltage to the second electrode member, which generates an electrostatic force. This electrostatic force moves the aft-shield into the optical path.

A method of achieving strobe-sync control by using the shutter device according to the first embodiment of the invention will be explained.

Figure 10:
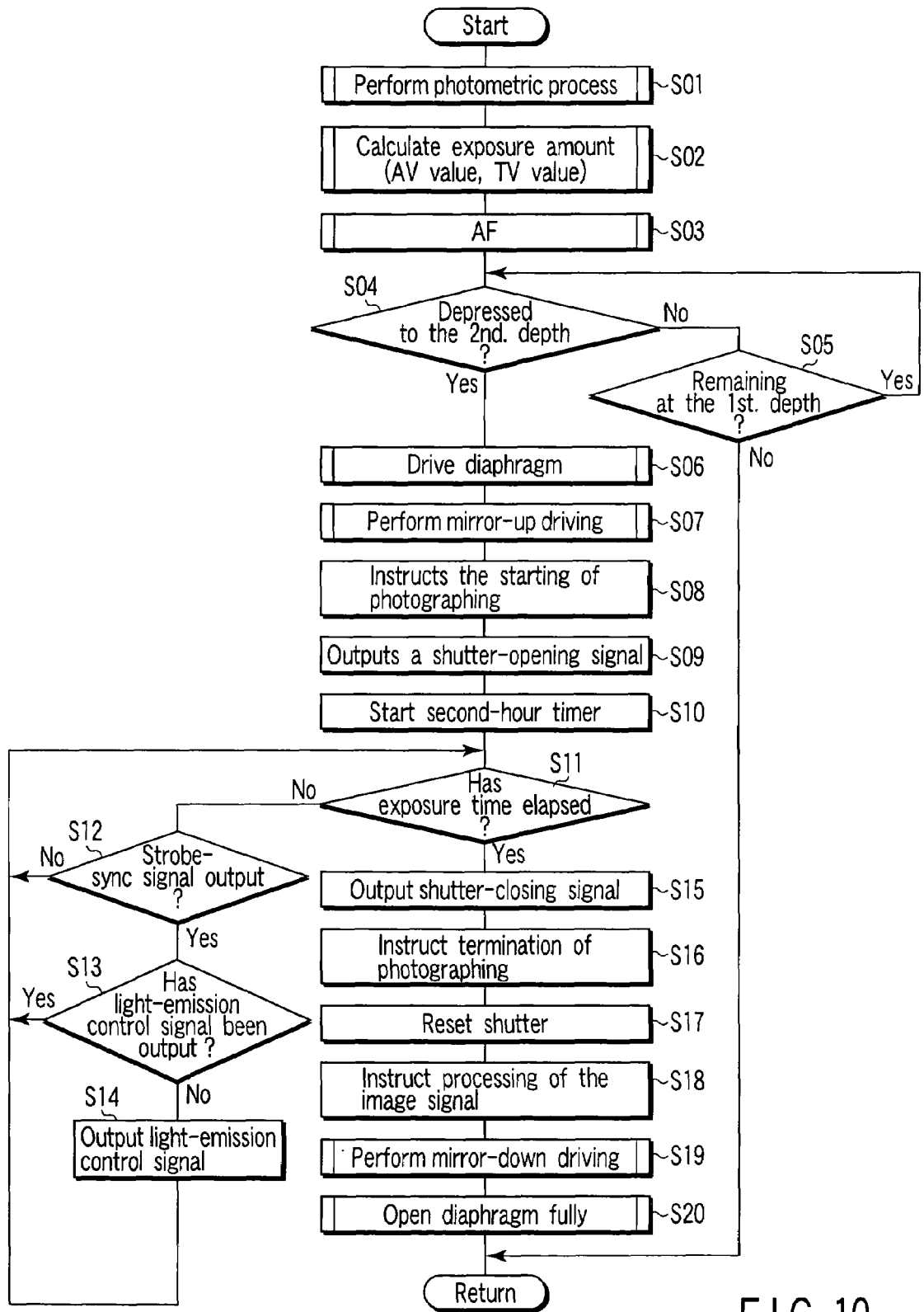
FIG. 10 is a flowchart illustrating how the microcomputer controls the body in the sequence of photographing.

FIG. 10 is a flowchart that outlines the sequence of photographing that Bucom 150 performs. This sequence is a part of the electronic-camera operation, which starts with the shutter releasing and ends with the generation of image data.

When the user depresses the release button to the first depth, this sequence starts. First, a photometric process is carried out in Step S01. More precisely, the luminance data about the object is acquired, which the photometer circuit 132 has measured. In Step S02, an exposure amount is calculated from the luminance data, thereby computing an appropriate aperture value (AV) and a desired shutter speed (TV, or time value).

In Step S03, an AF process is carried out. That is, the AF sensor unit 130a receives the flux emanating from the object, through the quick-return mirror 113b and sub-mirror 113d. The AF sensor unit 130a generates data representing the displacement of the object image received. This data is output to Bucom 150 through the AF-sensor drive circuit 130b. Bucom 150 calculates the displacement of the lens from the displacement of the object image. The data showing the lens displacement is transmitted to Lucom 105 via the communication connector 106. On the basis of the lens displacement, Lucom 105 drives the lens-driving mechanism 102. The mechanism 102 moves the photographing lens 112a, thus adjusting the position of focus.

After the position of focus has been adjusted, it is determined in Step S04 whether the user has further depressed the release button (to the second depth).

If No in Step S04, namely if the release button has not been pushed to the second depth, and if Yes in Step S05, namely if the release button remains at the first depth, Bucom 150 waits until the release button is depressed to the second depth. If No in Step S04, or if the release button has not been depressed to the second depth, and if No in Step S05, namely if the release button has not been pushed to the first depth, either, Bucom 150 determines that the user has stopped photographing. In this case, Bucom 150 terminates this sequence of photographing.

If Yes in Step S04, or if the release button has been depressed to the second depth, the photographing is continued. In Step S06, the diaphragm 103 is driven. More specifically, Bucom 150 transmits the AV value to Lucom 105 through the communication connector 106. Lucom 105 controls the diaphragm-driving mechanism 104 in accordance with the AV value. Thus controlled, the mechanism 104 drives the diaphragm 103.

In Step S07, mirror-up driving is carried out. That is, the mirror-driving mechanism 118 drives the quick-return mirror 113b to UP position, thereby providing a photographing optical path. In Step S08, Bucom 150 instructs the CCD interface circuit 134 to start the photographing. So instructed, the CCD interface circuit 134 operates the imaging element 27.

Thereafter, Bucom 150 controls the shutter. How Bucom 150 controls the shutter to achieve full exposure will be explained with reference to the shutter-control timing chart of FIG. 11.

Figure 11:
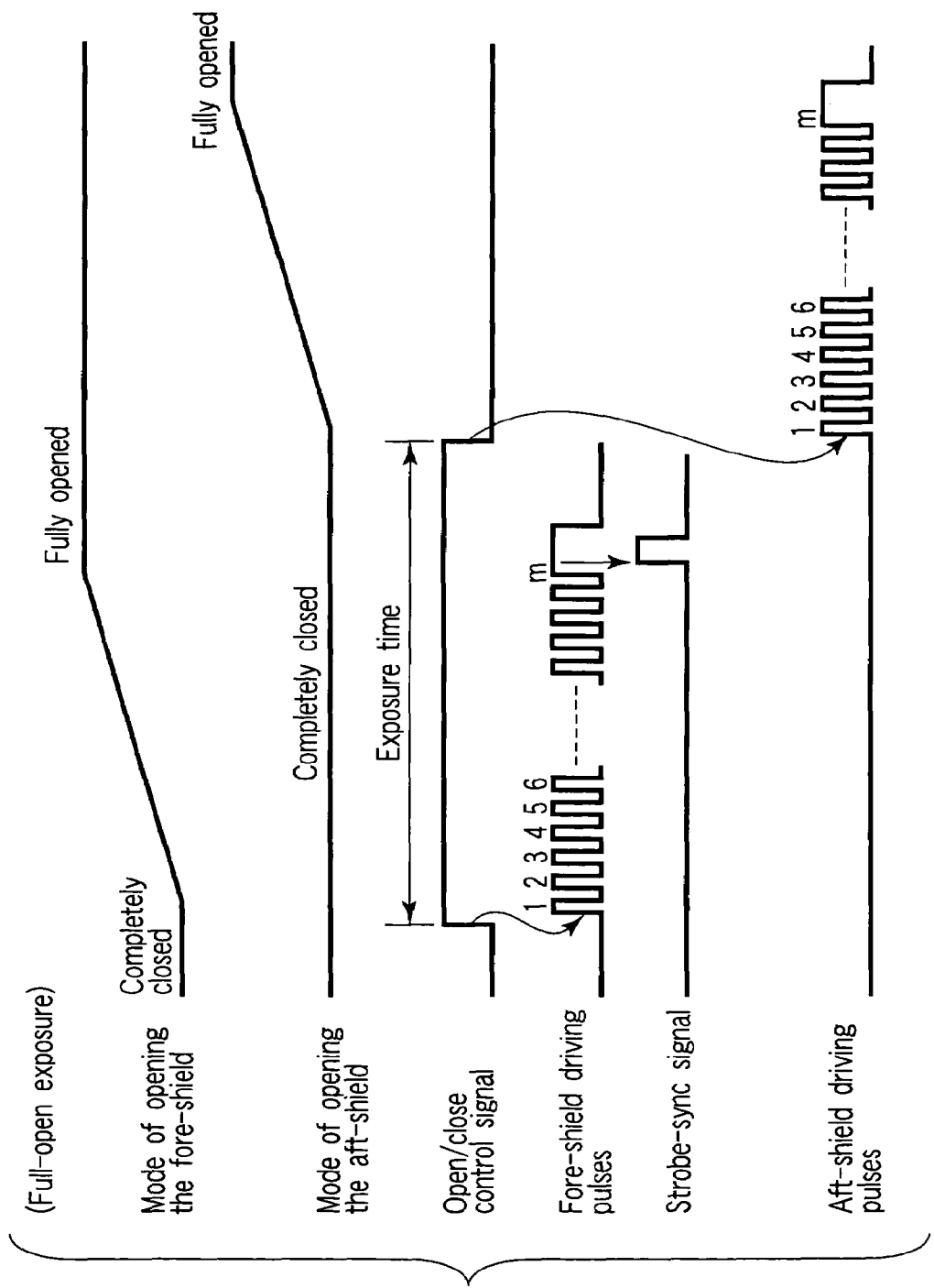
FIG. 11 is a timing chart illustrating the shutter control performed to achieve full exposure.

In Step S09, Bucom 150 outputs a shutter-opening signal to the shutter-drive control circuit 148. Namely, the open/close control signal is set at active level as shown in FIG. 11. In the shutter-drive control circuit 148, the pulse-generating circuit 12 receives the open/close control signal and starts outputting fore-shield drive pulses for driving the fore-shield 24a. The fore-shield 24a is driven from the position where it fully closes the exposure opening, and thus starts opening the exposure opening.

In Step S11, Bucom 150 determines whether the exposure time has elapsed.

If No in Step S11, namely if the exposure time has not elapsed, the operation goes to Step S12. In Step S12, Bucom 150 determines whether the shutter-drive control circuit 148 has output a strobe-sync signal as illustrated in FIG. 11. If No in Step S12, or if no strobe-sync signal has been output, Bucom 150 waits until a strobe-sync signal is output. Note that the shutter-drive control circuit 148 outputs a strobe-sync signal at the time when the fore-shield 24a reaches the position where it fully opens the exposure opening.

The fore-shield 24a (the aft-shield 24b, too), which has electrets as described above, is extremely light. Therefore, the fore-shield 24a can move at high precision and high speed when it is driven by the fore-shield drive pulses. This makes it unnecessary to use any detecting means to detect that the exposure opening has been fully opened. Whether the opening has been fully opened can be determined, merely by counting the fore-shield drive pulses.

As shown in FIG. 11, the shutter-drive control circuit 148 outputs a strobe-sync signal (rectangular-wave signal) to Bucom 150 at the time it finishes outputting a preset number of fore-shield drive pulses.

When the strobe-sync signal is found to become active, Bucom 150 outputs a light-emission control signal to the stroboscopic unit 180 in Step S14, instructing the unit 180 to emit light. If the light-emission control signal has already been output, Bucom 150 does not output the light-emission control signal again.

If Yes in Step S11, or if the exposure time has elapsed, the operation goes to Step S15. In Step S15, Bucom 150 outputs a shutter-closing signal. In other words, the open/close control signal is set at non-active level. In the shutter-drive control circuit 148, the pulse-generating circuit 12 receives the open/close control signal and starts outputting aft-shield drive pulses for driving the aft-shield 24b. The aft-shield 24a is driven from the position where it fully opens the exposure opening, and thus starts closing the exposure opening, as seen from the waveform shown in FIG. 11, which illustrates how the exposure opening is opened.

In Step S16, Bucom 150 instructs the CCD interface circuit 134 to stop the photographing. So instructed, the CCD interface circuit 134 causes the imaging element 27 of the imaging unit 22 to stop photographing the object.

In Step S17, Bucom 150 outputs a reset signal to the shutter-drive control circuit 148. In the shutter-drive control circuit 148 that has receives this signal, the pulse-generating circuit 12 drives the fore-shield 24a and the aft-shield 24b to their initial positions.

After Steps S09 to S17 have been performed, the operation goes to Step S18. In Step S18, Bucom 150 instructs the image-processing controller 140 to process the image data. The image-processing controller 140 receives a signal form the CCD interface circuit 134 and performs AD conversion on this signal, generating image data. The image data is processed, supplied via a communication connector 135 and recorded in the recording medium 139.

In Step S19, Bucom 150 causes the mirror-driving mechanism 118 to drive the quick-return mirror 113b to DOWN position. In Step S20, Bucom 150 instructs Lucom 105 to make the diaphragm-driving mechanism 104 open the diaphragm 103 fully. The photographing is thereby terminated.

Figure 12:
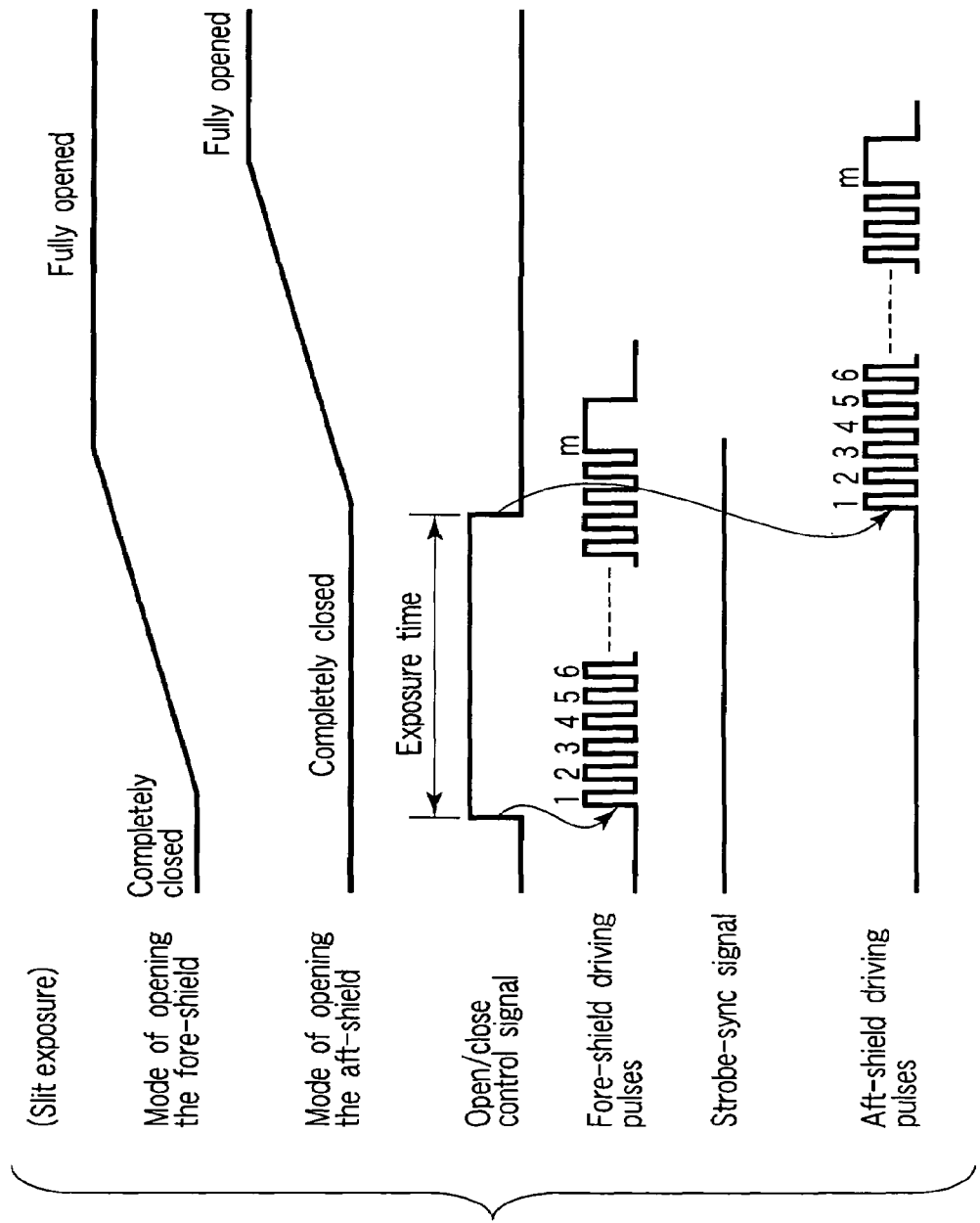
FIG. 12 is a timing chart illustrating the shutter control performed to accomplish slit exposure.

FIG. 12 is a timing chart that illustrates the shutter control performed to accomplish slit exposure.

If the object has high luminance, the exposure time elapses before the fore-shield 24a is fully opened. In this case, the shutter-drive control circuit 148 outputs no strobe-sync signals. Instead, it outputs aft-shield drive pulses. Therefore, the exposure opening is not fully opened and the slit defined by the fore-shield 24a and aft-shield 24b moves over the exposure opening. Photographing in the slit exposure will not be explained, because it is performed in the same way as shown in the flowchart of FIG. 10.

Second Embodiment of the Shutter Device

A shutter device according to the second embodiment of this invention will be described. The shutter device according to the second embodiment is fit for use in, for example, compact cameras. It differs from the first embodiment in two respects. First, the shutter unit is separated from the imaging unit. Second, the shutter unit functions as diaphragm mechanism, too. Hence, the components identical to those of the first embodiment will be designated at the same reference numerals and will not be described in detail.

FIGS. 13A and 13B are diagrams depicting the structures of the optical shields and explains the operation of the optical shields.

The optical shields 24d and 24e of this shutter unit are rectangular flat plates, each having a triangular notch. The optical shields 24d and 24e are positioned so that the notches meet with each other.

FIG. 13A shows the shutter in its initial state, fully closed. That is, the optical shields 24d and 24e overlap each other, shielding the light from the object. The optical shields 24d and 24e move in the directions of arrows shown in FIG. 13A, and the notches of the shields 24d and 24e overlap, forming an exposure opening that allows the passage of the light from the object. The area of the exposure opening changes as the optical shields 24d and 24e move so. FIG. 13B depicts the shutter in the full open state. Thus, the shutter not only shields light, but also acts as diaphragm.

FIG. 14 is a block diagram showing the system configuration of a camera that has the shutter device according to the second embodiment of the invention. The components identical to those of the first embodiment will be designated at the same reference numerals and will not be described in detail.

In the second embodiment, the lens and stroboscopic tube are not units separated from the camera unit. Rather, they are integrally formed with the camera.

The shutter unit 203 is separated from the imaging unit 222 and is provided between the imaging optical systems 112a and 112b. The unit 203 not only shields light, but also functions as diaphragm. The shutter unit 203 is controlled by the shutter-drive control circuit 204. Hence, it is not necessary to use a stepping motor as in the first embodiment to drive the diaphragm.

The shutter-drive control circuit 204 supplies and receives signals to and from Bucom 150 in order to control the shutter unit 203 that operates as both a shutter and a diaphragm. The circuit 204 outputs a strobe-light-emission signal directly to the strobe control microcomputer 183.

This camera does not have components of single-lens reflex type (i.e., penta-prism 113a, quick-return mirror 113b, objective lens 113c and sub-mirror 113d). Hence, the photometer circuit 201 directly measures the luminance of the object, and the distance-measuring circuit 202 is configured to measure the distance to the object.

The camera has a nonvolatile memory 129. The memory 129 is an EEPROM that is a nonvolatile storage means storing control parameters for controlling the camera. Bucom 150 can make access to the nonvolatile memory 129.

The shutter device according to the second embodiment of the invention comprises the shutter unit 202 and shutter-drive control circuit 204, as is illustrated in FIG. 14.

Figure 15:
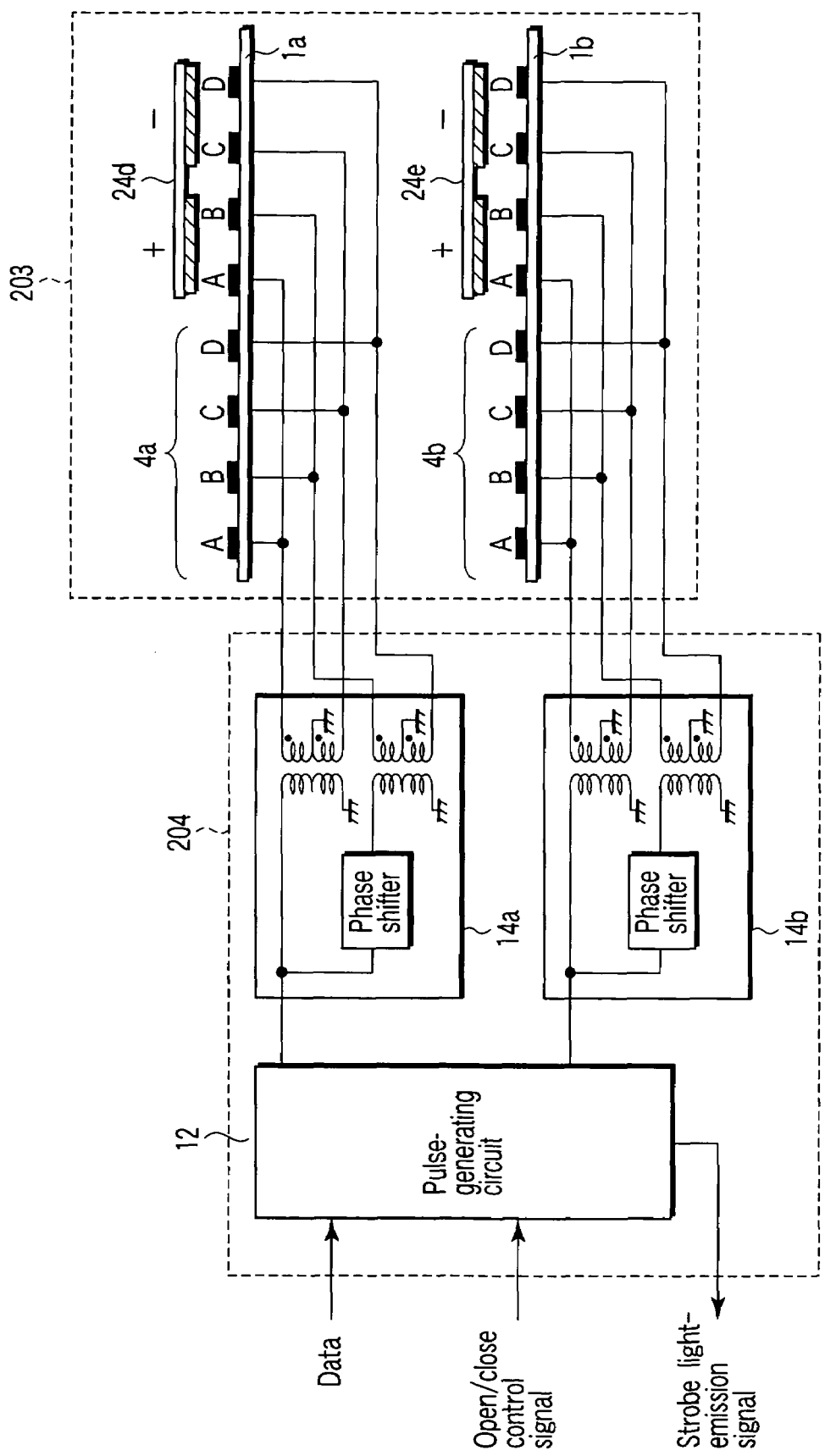
FIG. 15 is a diagram illustrating how signals are supplied from the shutter-drive control circuit to the shutter unit.

FIG. 15 is a diagram illustrating how signals are supplied from the shutter-drive control circuit 204 to the shutter unit 203. The shutter unit 203 has the optical shields 24d and 24e as indicated above. To drive these optical shields, two drive circuits are provided, which have the configuration shown in FIG. 2.

The pulse-generating circuit 12 drives the optical shields 24d and 24e at the same time by prescribed distances, in accordance with data and an open or close control signal supplied from Bucom 150. As a result, the area of the exposure opening shown in FIG. 13 is controlled. The pulse-generating circuit 12 outputs a strobe-light-emission signal to Bucom 150 at a predetermined timing.

As stated above, the booster circuits 14a and 14b shown in FIG. 15 applies a specific multi-phase AC voltage to the first and second electrode members, which generate an electrostatic force. The electrostatic force moves the first light-shielding film and second light-shielding film to prescribed positions, thus controlling the area of the opening defined by the openings of the first and second light-shielding films. Thus, the circuits 14a and 14b is drive means for controlling the area of this opening. The pulse-generating circuit 12 is a drive-signal supplying means for supplying pulse signals to the drive mean. Bucom 15 is a shutter-controlling means for instructing the drive-signal supplying means to drive the light-shielding films.

The pulse-generating circuit 12 performs another function. It operates as signal-outputting means for outputting a signal for causing the stroboscopic tube to emit light, when the drive-signal supplying means outputs a preset number of pulses.

A method of controlling the strobe light emission will be described, which uses the shutter device according to the second embodiment.

Figure 16:
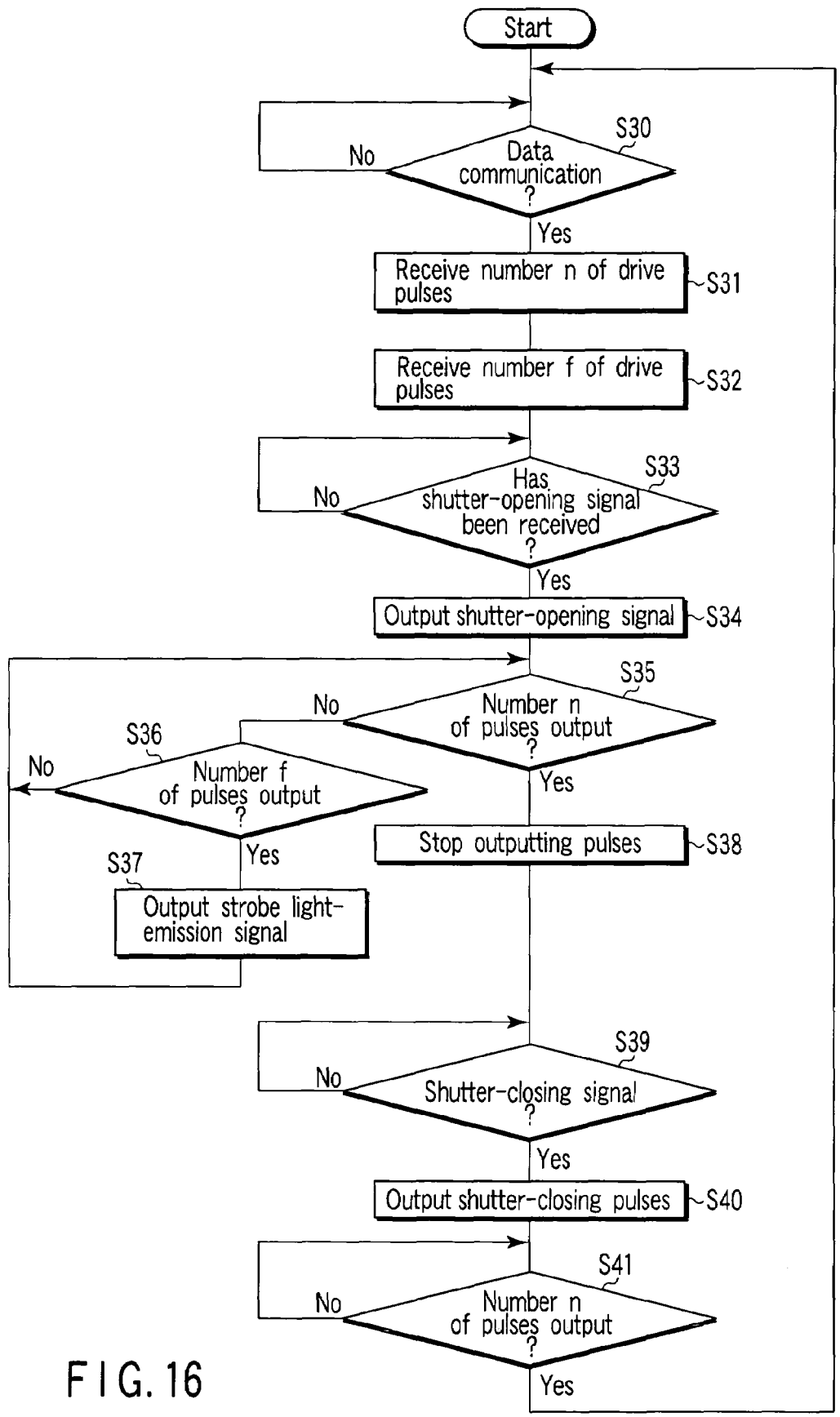
FIG. 16 is a flowchart briefly explaining how the shutter-drive control circuit operates.

FIG. 16 is a flowchart briefly explaining how the shutter-drive control circuit 204 operates.

In Step S30, the shutter-drive control circuit 204 waits until it receives from Bucom 15 the data representing the area that the exposure opening should have. If Yes in Step S30, namely if the circuit 204 receives the data, the circuit 204 receives the number n of drive pulses for driving the optical shield 24e, in Step S31. The circuit 204 receives the number f of drive pulses for driving the optical shield 24e, in Step S32.

In the camera according to the second embodiment, the stroboscopic tube emits light not when the diaphragm is fully opened, but when the diaphragm attains the aperture value (AV) obtained from the guide number (GNo) of the stroboscopic tube and the distance (L) to the object. The number f is the number of pulses that drive the optical shields 24d and 24e to make the diaphragm attain the aperture value. The number f has been calculated by Bucom 15.

In Step S33, the shutter-drive control circuit 204 waits until it receives a shutter-opening signal from Bucom 15. If Yes in Step S33, or if the circuit 204 receives a shutter-opening signal, the circuit 204 starts performing a control.

Figure 17:
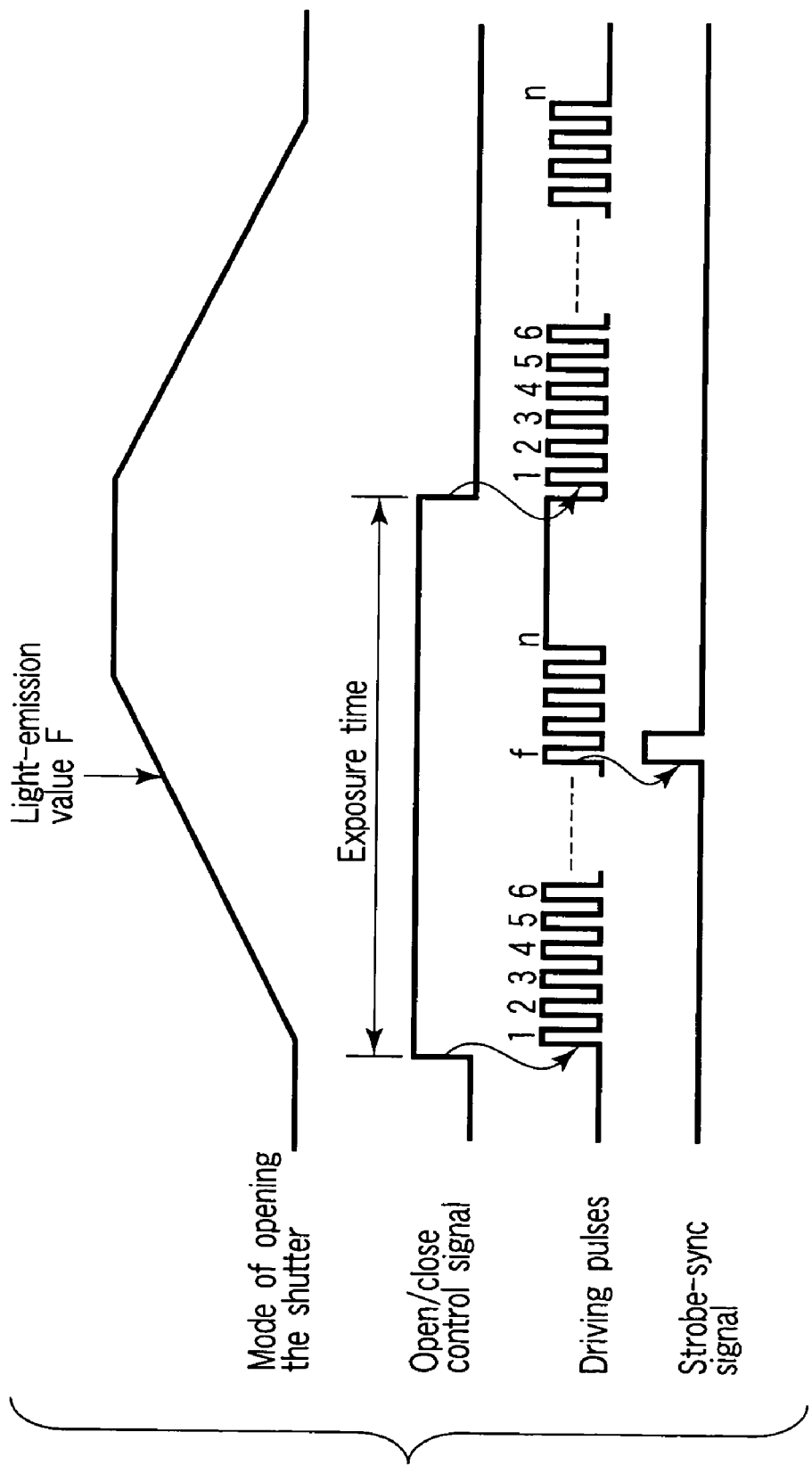
FIG. 17 is a timing chart illustrating how the shutter is controlled.

When the shutter-opening signal is input, namely when the open/close control signal becomes active as shown in FIG. 17, the pulse-generating circuit 12 of the shutter-drive control circuit 204, which receives this signal, outputs a train of drive pulses for driving the optical shields 24d and 24e in Step S34. The exposure opening may be thereby expanded.

In Step S35 it is determined whether the shutter-drive control circuit 204 has output a predetermined number n of pulses.

If No in Step S35, or if the circuit 12 has not output n pulses yet, it is determined in Step S36 whether f pulses have been output. If No in Step S36, namely if the circuit 12 has not output f pulses yet, it keeps outputting drive pulses until it outputs the fth pulse. At the time the shutter-drive control circuit 12 outputs the fth pulse, the shutter-drive control circuit 204 outputs a strobe-light-emission signal to the strobe control microcomputer 183.

If Yes in Step S35, or when the circuit 12 outputs the nth pulse, the shutter-drive control circuit 12 stops outputting drive pulses for driving the optical shields 24d and 24e in Step S38. In Step S39, the shutter-drive control circuit 204 waits in Step S39 until Bucom 150 outputs a shutter-closing signal. If Yes in Step S39, or if the exposure time has elapsed, Bucom 150 outputs a shutter-closing signal in Step S40. The open/close control signal is thereby made inactive.

In Step S40, the shutter-drive control circuit 204 outputs pulses for driving the optical shields 24d and 24e to close the exposure opening. In Step S41, after having output a predetermined number of pulses and caused the optical shields 24d and 24e to close the exposure opening fully, the circuit 204 waits until it is again instructed to control the shutter.

The shutter device according to each embodiment described above have an electret shutter. Hence, in the shutter device, the optical shields can be driven at higher speed and controlled with higher precision than in the conventional shutter device that has a stepping motor.

Having no stepping motors for driving the optical shields, the shutter device can be light and can be made thin. Thus, if the shutter device is incorporated in a camera, it will help to reduce the size and weight of the camera.

Since the shutter device consumes but small power, it can serve to save energy and resources.

The second embodiment of this invention need not have a stepping motor to drive the diaphragm mechanism and the diaphragm. Therefore, the second embodiment can be further reduced in size and weight and can be manufactured at low cost.

An imaging module according to the present invention will be described.

First Embodiment of the Imaging Module

A first embodiment of an imaging module is identical to the imaging module that has been described in conjunction with the first embodiment of the shutter device. Therefore, it will not be described in detail.

Second Embodiment of the Imaging Module

FIG. 18 is a sectional view of a second embodiment of the imaging module according to this invention.

The second embodiment of the imaging module differs from the first embodiment in that the fixed members 1a works as glass cover 29 as well. The components identical to those of the first embodiment are designated at like reference numerals and will not be described in detail in terms of structure or operation.

In the second embodiment, the glass cover 29 is unnecessary. The imaging module can therefore be thin. This is an advantage that the second embodiment has in addition to those of the first embodiment.

Third Embodiment of the Imaging Module

FIG. 19 is a sectional view showing the structure of the shutter unit provided in a third embodiment of the imaging module according to the invention.

The third embodiment differs from the first embodiment in that a light-transmission control film 31 is provided on the protective member 25. Thus, the components identical to those of the first embodiment are designated at like reference numerals and will not be described in detail in terms of structure or operation. Since the imaging unit 22 is identical to the imaging unit of the second embodiment, it is not illustrated in FIG. 19.

The light-transmission control film 31 is a filter that adjusts the amount of coming light in order to accomplish appropriate imaging and obtain images containing desired information. The light-transmission control film 31 may be an ND filer, a light-amount controlling film 31*a* such as an electrochromic element, an infrared filter 31*b* that allows passage of light beams having wavelengths falling within a specific range, a low-pass filter 31*c*, a band-pass filter 31*d*, or the like.

In the third embodiment, the light-transmission control film 31 does not increase the thickness of the imaging module because it is provided on the protective member 25. This is an advantage that the third embodiment has in addition to those of the second embodiment.

The light-transmission control film 31 may be fixed to the protective member 25 or be provided to move with respect to the protective member 25. The mechanism for moving the film 31 may be the electrets described above or a drive mechanism of any other type.

Fourth Embodiment of the Imaging Module

FIG. 20 is a sectional view depicting the structure of the shutter unit provided in a fourth embodiment of the imaging module according to this invention.

The fourth embodiment differs from the third embodiment in that light-transmission control films 31 (31*a*, 31*b* and 31*c*) are provided on the protective member 25, fixed member 1*a* and fixed member 1*b*, respectively. The components identical to those of the third embodiment are designated at like reference numerals and will not be described in detail in terms of structure or operation. The imaging unit 22 is identical in structure to the imaging unit of the second embodiment, and is not shown in FIG. 20.

In the fourth embodiment, a plurality of light-transmission control films 31 (31*a*, 31*b* and 31*c*) are provided on the protective member 25, fixed member 1*a* and fixed member 1*b*, respectively. Therefore, they overlap one another, without increasing the thickness of the imaging module. This is an advantage that the fourth embodiment has in addition to those of the first or second embodiment.

The light-transmission control films 31 (31*a*, 31*b* and 31*c*) may be fixed to the protective member 25, fixed member 1*a* and fixed member 1*b*. Alternatively, they may be provided to move with respect to the protective member 25, fixed member 1*a* and fixed member 1*b*. In this case, they may be driven by the electrets described above or by a drive mechanism of any other type. Note that the order in which the light-transmission control films 31 arranged is not limited to the order illustrated in FIG. 20.

Fifth Embodiment of the Imaging Module

FIG. 21 is a sectional view depicting the structure of a fifth embodiment of the imaging module according to the invention.

The fifth embodiment differs from the second embodiment in that the imaging element 27 is provided on the reverse surface of the fixed member 1*a*. The components identical to those of the second embodiment are designated at like reference numerals and will not be described in detail in terms of structure or operation.

The imaging element 27 is mounted, in the form of a flip chip, on the reverse surface of the fixed member 1*a*. A wiring pattern 30 designed to drive the imaging element 27 is printed on the reverse surface of the fixed member 1*a*.

No space needs to be provided for the signal lines 28 in the fifth embodiment. This helps to render the imaging unit thin, ultimately making the imaging module still thinner.

Sixth Embodiment of the Imaging Module

Figure 22:
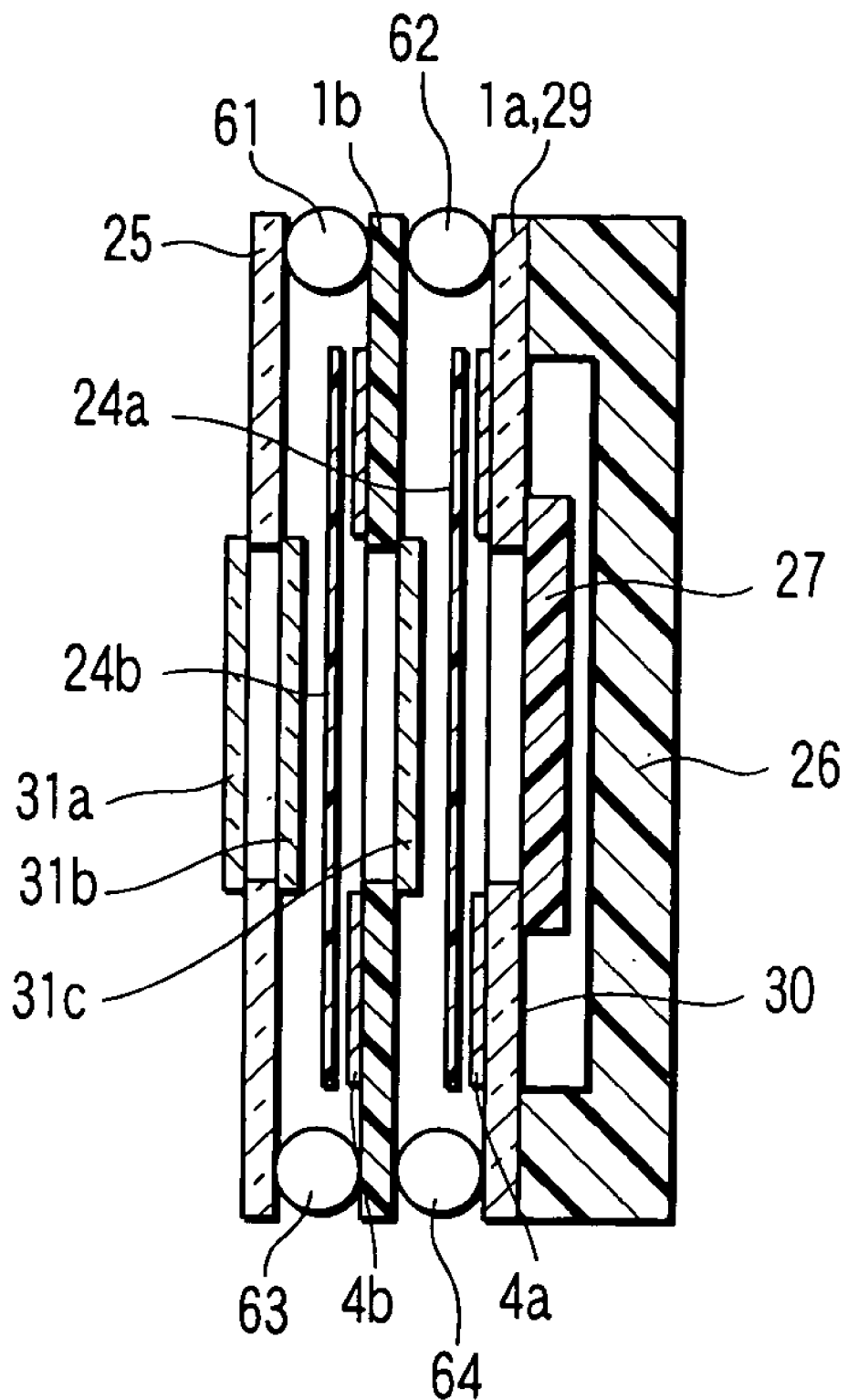
FIG. 22 is a sectional view showing the structure of a sixth embodiment of the imaging module according to the invention.

FIG. 22 is a sectional view showing the structure of a sixth embodiment of the imaging module according to the invention.

The sixth embodiment differs from the fifth embodiment in that the light-transmission control films 31 (31*a*, 31*b* and 31*c*) are provided on the protective member 25 of the shutter unit 21 and the fixed member 1*b*. Thus, the components identical to those of the fifth embodiment are designated at like reference numerals and will not be described in detail in terms of structure or operation.

In the sixth embodiment, light-transmission control films 31 (31*a*, 31*b* and 31*c*) can be arranged, each overlapping another, without increasing the thickness of the imaging module. This is an advantage that the sixth embodiment has in addition to those of the fifth embodiment.

The light-transmission control films 31 (31*a*, 31*b* and 31*c*) may be fixed to the protective member 25 and fixed member 1*b*. Instead, they may be provided to move with respect to the protective member 25 and fixed member 1*b*. In this case, they may be driven by the electrets described above or by a drive mechanism of any other type. Note that the order in which the light-transmission control films 31 arranged is not limited to the order illustrated in FIG. 22.

In each embodiment described above, the shutter unit 21 has two optical shields, i.e., fore-shield 24*a* and aft-shield 24*b*. Nevertheless, the present invention is not limited to this configuration. The shutter unit 21 may be composed of one optical shield.

Each embodiment described above can provide an imaging module that comprises a shutter unit and an imaging unit formed integrally with the shutter unit. The imaging module can therefore be thin.

An electrostatic actuator according to the present invention will be described below.

Figure 23:
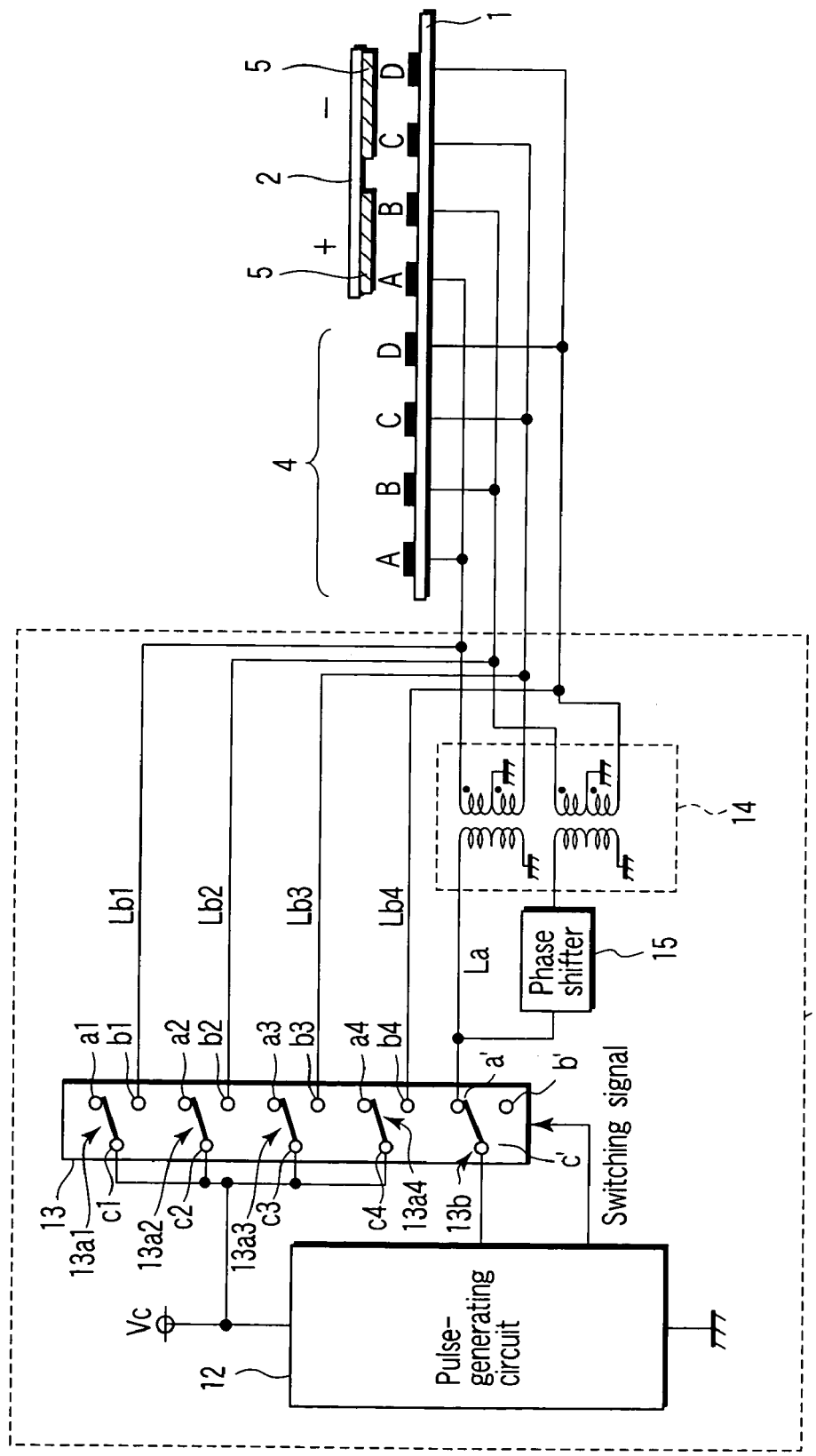
FIG. 23 is a diagram illustrating the basic structure of an electret shutter.

FIG. 23 is a diagram illustrating the basic structure of an electret shutter that has the electrostatic actuator according to this invention. More precisely, FIG. 23 depicts in detail the structure of the electret shutter shown in FIG. 2.

The right part of FIG. 23 is a schematic sectional view of the electret shutter. Voltage-signal lines extending from a drive circuit 10 are connected to the drive electrodes 4 that are arranged on the fixed member 1. Through the voltage-signal lines, 4-phase voltage signals are supplied. Hence, the same voltage signal is supplied to every fourth drive electrode 4. In FIG. 23, the four drive signals of each group are designated as A, B, C and D, so that the voltage signals may be distinguished from one another.

A plurality of permanently polarized dielectric elements (electrets) 5 are provided on that surface of the movable member 2, which faces the fixed member 1. Instead, the movable member 2 may be electrets that are arranged at pitch, thus equidistantly spaced from one another.

Shown in the left part of FIG. 23 is the drive circuit 10 that generates voltage signals to be supplied to the electret shutter. In the drive circuit 10, the pulse-generating circuit 12 generates a rectangular-wave train (drive pulse signal), which is supplied to the booster circuit 14 and the phase shifter 15. The booster circuit 14 raises the voltage of the drive pulse signal to about 100 V and divides the train into two voltage signals, one having positive polarity and the other having negative polarity. These voltage signals are supplied to the drive electrodes A and C, respectively.

The rectangular-wave train input to the phase shifter 15 is delayed in phase by 90°. Thereafter, this train is input to the booster circuit 14 and changed to two rectangular-wave trains similar to those described above. The rectangular-wave trains are supplied to the drive electrodes B and D.

A switch 13 is provided to switch the voltage applied to the electret shutter, in accordance with a switching signal supplied from the pulse-generating circuit 12. The switch 13 includes a plurality of switches $13a_1$ to $13a_4$ and $13b$. The terminals c1 to c4 of the switches $13a_1$ to $13a_4$ are connected to a power supply Vc that applies a power-supply voltage (e.g., 5 V) to various circuits including the pulse-generating circuit 13. Terminals $a_1$ to $a_4$ are opened. Terminals $b_1$ to $b_4$ are connected by lines $Lb_1$ to $Lb_4$ to all drive electrodes.

The terminal c' of the switch $13b$ is connected to the rectangular-wave train output terminal Po of the pulse-generating circuit 12. The terminal a' of the switch $13b$ is connected to the booster circuit 14 and phase shifter 15. The terminal b' of the switch $13b$ is opened.

To drive the movable member 2 of the electret shutter, the pulse-generating circuit 12 outputs a switching signal to the switch 13, connecting the terminals c of the switches $13a_1$ to $13a_3$ to the terminals $a_1$ to $a_4$ thereof, and connecting the terminal c' of the switch $13b$ to the terminal a' thereof. The rectangular-wave train output from the pulse-generating circuit 12 is thereby supplied to the booster circuit 14 and phase shifter 15.

Not to drive the movable member 2 of the electret shutter (that is, in order to stop the element 2 where it is), the pulse-generating circuit 12 outputs a switching signal to the switch 13, connecting the terminals $c_1$ to $c_4$ of the switches $13a_1$ to $13a_4$ to the terminals $b_1$ to $b_4$ thereof, and connecting the terminal c' of the switch $13b$ to the terminal b' thereof. All drive electrodes are thereby connected to the power supply Vc.

As a result, the electret parts that have polarity different from that of the voltage applied to the electrodes remain attracted to the electrodes. In other words, a direct current is supplied to the drive electrodes when the movable member 2 need not be driven. Then, the movable member 2 will not be displaced even if an external force acts on it. The voltage applied to the drive electrodes is the power-supply voltage of the circuit, not a boosted voltage. Therefore, the voltage can be the lowest one required, and the power consumption is smaller than in the case where a boosted voltage is applied to the drive electrodes.

First Embodiment of the Electrostatic Actuator

The first embodiment of the electrostatic actuator according to the present invention has a stopper that sets the movable member 2 at the initial position.

FIG. 24 is a diagram showing the structure of the first embodiment of the electrostatic actuator, which has a mechanical stopper. That is, the electrostatic actuator comprises a mechanical stopper 36 secured to the fixed member 1, at a predetermined part thereof. The movable member 2 is set at the initial position when it abuts on the stopper. The mechanical stopper 36 may not be secured to the fixed member 1. Instead, it may be arranged parallel to the drive electrodes and may be used as a spacer (not shown) as well.

FIG. 25 is a diagram showing the structure of an electrostatic actuator that has an electric stopper. This electrostatic actuator has an electret member 37 secured to the fixed member 1, at a prescribed part thereof. The electret member 37 repels the electret parts provided on the movable member 2 and having the same polarity as the electret member 37. Thus, the electret member 37 sets the movable member 2 at the initial position. The electret member 37 provided on the fixed member 1 may have the polarity opposite to that of the electret parts provided on the movable member 2. In this case, the electret member 37 attracts the electret parts provided on the movable member 2, to set the movable member 2 at the initial position.

Figure 26:
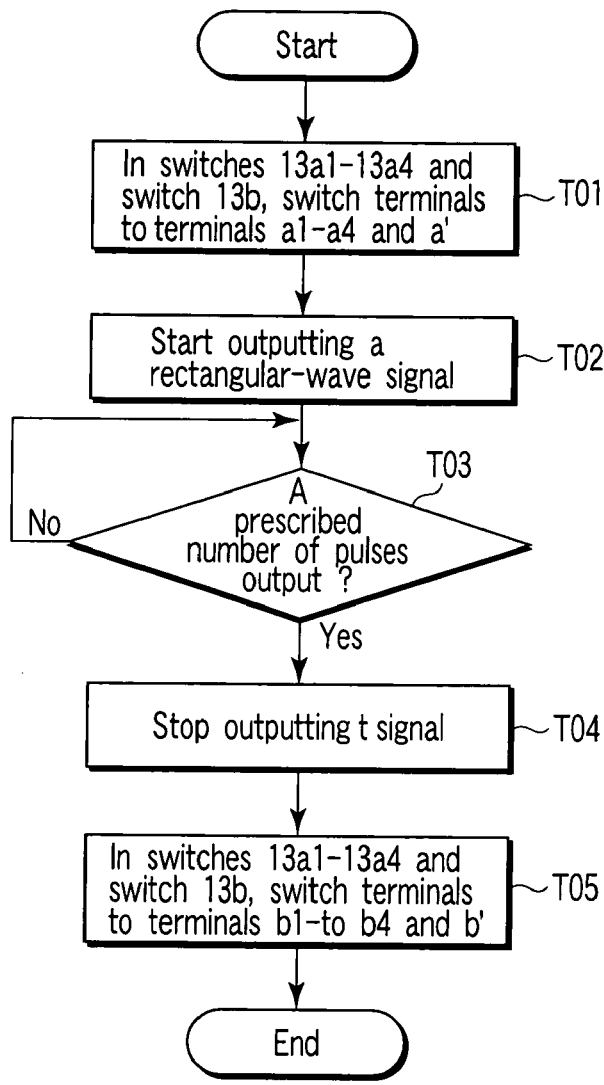
FIG. 26 is a flowchart outlining the initial operation of the electrostatic actuator.

How the electrostatic actuator according to this embodiment operates will be described. FIG. 26 is a flowchart outlining the initial operation of this electrostatic actuator.

After the power switch to the drive circuit 10 is turned on, the following initial operation is performed prior to the actual operation of the electrostatic actuator.

In Step T01, a switching signal is output to the switch 13. In the switches $13a_1$ to $13a_4$ and switch $13b$, the terminals $c_1$ to $C_4$ and terminal c' are connected to the terminals $a_1$ to $a_4$ and a'. The rectangular-wave train output terminal Po of the pulse-generating circuit 12 is thereby connected to the booster circuit 14 and phase shifter 15.

In Step T02, the circuit 12 starts outputting a rectangular-wave signal. In Step T03, it is determined whether a prescribed number of pulses have been output. If Yes in Step T03, the circuit 12 stops outputting the signal in Step T04. In Step T05, a switching signal is output to the switch 13, whereby the terminals $c_1$ to $c_4$ and terminal c' are connected to the terminals $b_1$ to $b_4$ and b' in the switches $13a_1$ to $13a_4$ and switch $13b$. Thus, all drive electrodes 4 are connected to the power supply Vc, holding the movable member 2 at the initial position. Drive control can then be carried out.

In this embodiment, a mechanical stopper or an electric stopper is provided at the initial position. When the power switch is turned on, an initializing pulse signal is output. That is, a prescribed number of pulses are output to move the movable member 2 for a longest distant it can. As a result, the movable member 2 can arrive at the stopper without fail, no matter where it is located (even if it lies at the longest distance from the stopper). This facilitates the initial positioning of the movable member 2.

First Variation of the Electrostatic Actuator

Figure 27:
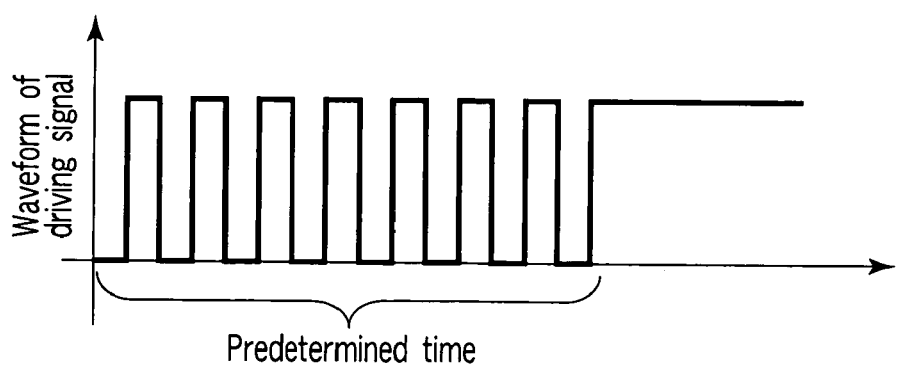
FIG. 27 is a diagram illustrating how initializing pulse signals are sequentially output for a predetermined time.

A first variation of the electrostatic actuator will be described below. In the first embodiment, a prescribed number of pulses are output. This variation differs from the first embodiment in that an initializing pulse signal is continuously output for a predetermined time until a prescribed number of pulses are output as is illustrated in FIG. 27.

Figure 28:
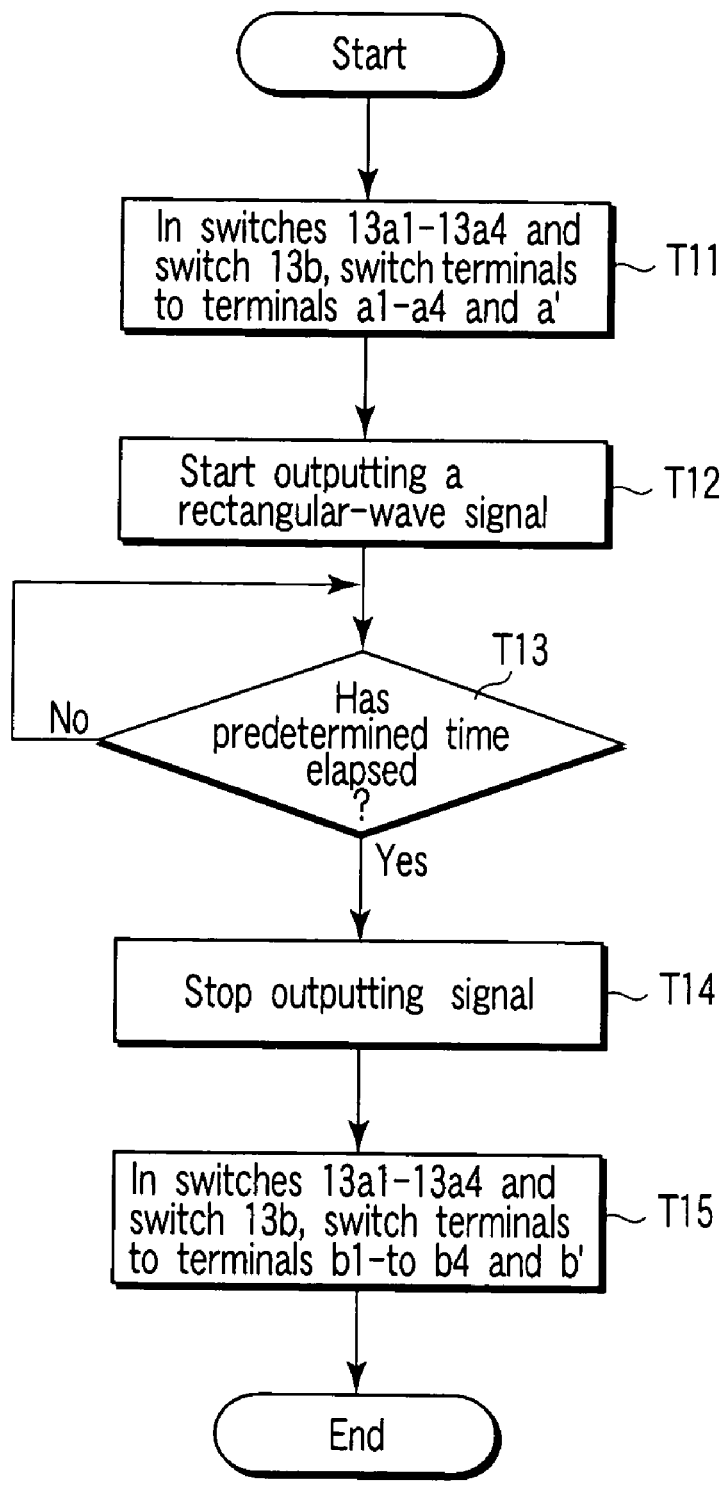
FIG. 28 is a flowchart outlining the initial operation of the electrostatic actuator.

FIG. 28 is a flowchart outlining the initial operation of the first variation of the electrostatic actuator.

Before the actual drive control is performed after the start of supply of power to the drive circuit 10, the following initial operation is carried out.

In Step T11, a switching signal is output to the switch 13. In the switches $13a_1$ to $13a_4$ and switch $13b$, the terminals $c_1$ to $c_4$ and terminal c' are connected to the terminals $a_1$ to $a_4$ and the terminal a'. The rectangular-wave train output terminal Po of the pulse-generating circuit 12 is thereby connected to the booster circuit 14 and phase shifter 15.

In Step T12, the circuit 12 starts outputting a rectangular-wave signal. In Step T14, it stops outputting the signal when a predetermined time elapses in Step T13. In Step T15, a switching signal is output to the switch 13, whereby the terminals $c_1$ to $C_4$ and terminal c' are connected to the terminals $b_1$ to $b_4$ and b' in the switches $13a_1$ to $13a_4$ and switch

13b. All drive electrodes 4 are thereby connected to the power supply Vc, holding the movable member 2 at the initial position. Drive control can then be carried out.

In this embodiment, pulses are output for a predetermined time that corresponds to the longest distant the movable member 2 can move. As a result, the movable member 2 can arrive at the stopper without fail, no matter where it is located (even if it lies at the longest distance from the stopper), as in the first embodiment. This facilitates the initial positioning of the movable member.

Second Embodiment of the Electrostatic Actuator

In the second embodiment of the electrostatic actuator according to this invention, the movable member 2 is stopped at the initial position when it is detected to have reached the initial position.

FIG. 29 is a diagram depicting the structure of an electrostatic actuator that has a detection electrode. The detection electrode 40 is arranged on the fixed member 1, at a position that corresponds to the initial position. The output from the detection electrode 40 is input to a monitor circuit 41.

The monitor circuit 41 comprises a current-to-voltage converting circuit 41a, an amplifier 41b, and a decision circuit 41c. The circuit 41 outputs a trigger signal when it detects that the movable member 2 has approached the detection electrode 40.

How this embodiment of the electrostatic actuator operates will be described.

FIGS. 30A and 30B and FIGS. 31A and 31B are diagrams that explain how the detection electrode performs its function. As FIG. 30A shows, the movable member 2 may be at some distance from the detection electrode 40. In this case, as FIG. 30B shows, the output voltage of the amplifier 41b is lower than the threshold level that is set in the decision circuit 41c. Hence, the monitor circuit 41 outputs no trigger signals.

When the movable member 2 approaches the detection electrode 40 as shown in FIG. 31A, the electret 5 provided on the movable member 2 induces a charge in the detection electrode 40. This induction charge increases as the movable member 2 moves toward the detection electrode 40. The change in the induction charge results in a current. This current increases as the movable member 2 approaches the detection electrode 40.

The current-to-voltage converting circuit 41a converts the current into an electric signal, which is supplied to the amplifier 41b. The amplifier 41b amplifies the electric signal. As a result, as FIG. 31B shows, the output voltage of the amplifier 41b has a level higher than the reference level, i.e., the threshold level set in the decision circuit 41c. The monitor circuit 41 therefore outputs a trigger signal.

Figure 32:
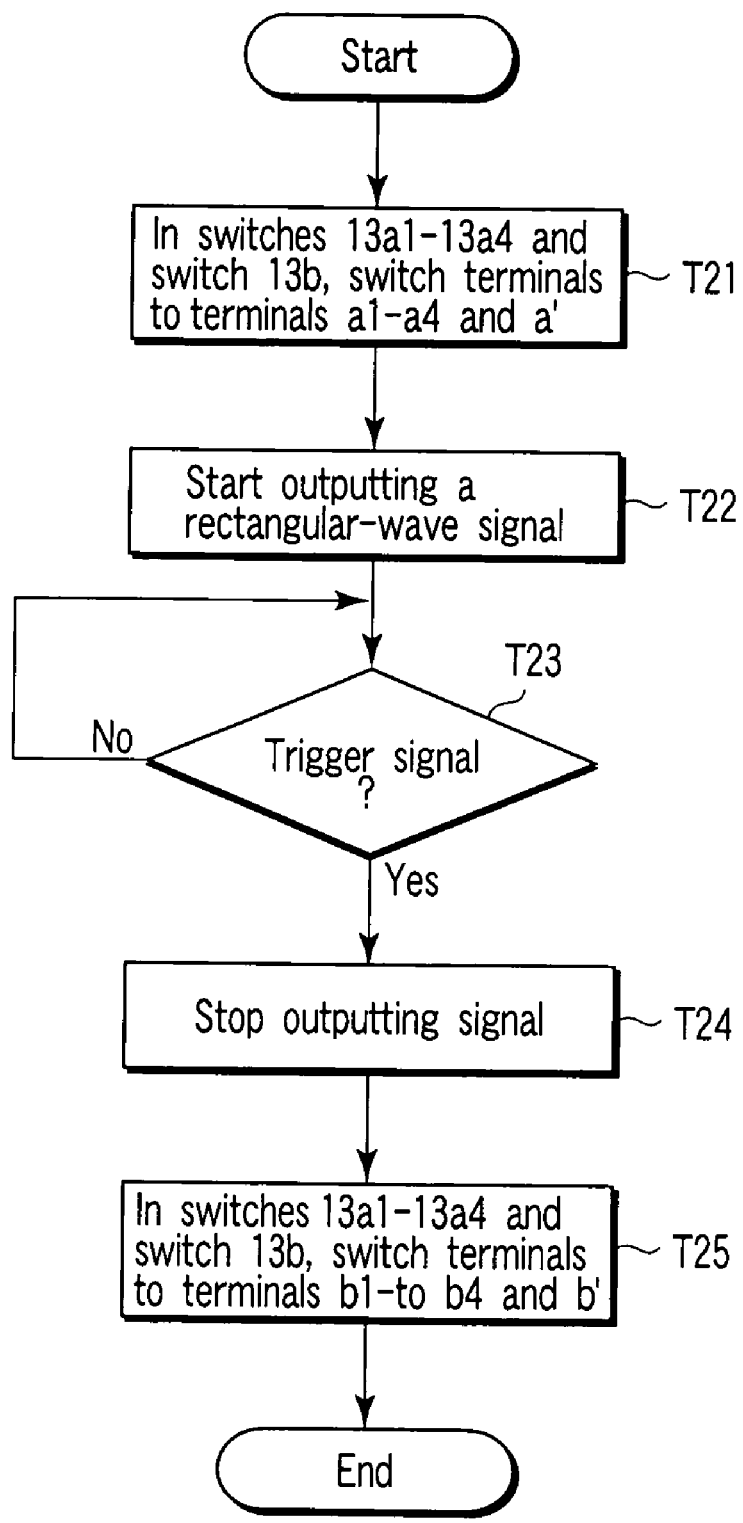
FIG. 32 is a flowchart outlining how the electrostatic actuator is initialized.

FIG. 32 is a flowchart outlining how the electrostatic actuator is initialized. After the power switch to the drive circuit 10 is turned on, the following initial operation is carried out before the actual operation of the electrostatic actuator.

In Step T21, a switching signal is output to the switch 13. In the switches $13a_1$ to $13a_4$ and switch 13b, the terminals $c_1$ to $C_4$ and terminal c' are connected to the terminals terminals $a_1$ to $a_4$ and the terminal a'. The rectangular-wave train output terminal Po of the pulse-generating circuit 12 is thereby connected to the booster circuit 14 and phase shifter 15.

In Step T22, the pulse-generating circuit 12 starts outputting a rectangular-wave signal. In Step T23, it is determined whether the monitor circuit 41 has started outputting a trigger signal. If Yes in Step S23, the circuit 41 stops outputting the signal in Step S24. That is, the decision circuit 41c outputs a trigger signal to the pulse-generating circuit 12 if the output signal of the amplifier 41b exceeds the threshold level. The pulse-generating circuit stops outputting the initializing pulse signal when it receives the trigger signal. In Step T25, a switching signal is output to the switch 13. The terminals $c_1$ to $c_4$ and terminal c' are thereby connected to the terminals $b_1$ to $b_4$ and b' in the switches $13a_1$ to $13a_4$ and switch 13b. Thus, all drive electrodes 4 are connected to the power supply Vc, holding the movable member 2 at the initial position. Drive control can then be carried out.

The threshold level may be changed, making it possible to change the timing of outputting the trigger signal. Hence, the detection distance between the movable member 2 and the detection electrode 40 can be adjusted.

The monitor circuit 41 may be provided on the fixed member 1, spaced apart from the electrostatic actuator. A magnetized member may be mounted on movable member 2, and a Hall element may be used as detection electrode. In this case, too, it can be detected that the movable member is approaching.

Third Embodiment of the Electrostatic Actuator

The third embodiment of the electrostatic actuator according to this invention will be described. In the second embodiment, the change in the charge induced as the movable member 2 approaches is detected. The third embodiment differs in that a change in the capacitance is detected, which occurs as the movable member approaches. Thus, the components identical to those of the second embodiment are designated at like reference numerals and will not be described in detail.

FIG. 33 is a diagram showing the structure of the third embodiment of the electrostatic actuator. This electrostatic actuator has a detection electrode 45a and a detection electrodes 45b. The detection electrode 45a is arranged on the fixed member 1, at a position that corresponds to the initial position. The detection electrode 45b is arranged on a protective member 43, at a position that corresponds to the initial position.

The movable member 2 may move into the space between these detection electrodes 45a and 45b, thus changing capacitance. A monitor circuit 46 monitors any change of the capacitance.

The monitor circuit 46 comprises a diode-bridge (capacitance bridge) circuit 46a, an amplifier 46b, and a decision circuit 46c. The circuit 46 outputs a trigger signal when it detects that the capacitance between the detection electrodes 45a and 45b changes by a value equal to or greater than a predetermined one as the movable member 2 moves into the space between the detection electrodes 45a and 45b.

The initialization of the third embodiment of the electrostatic actuator is identical to that of the second embodiment shown in FIG. 32. Therefore, the initialization will not be described in detail.

The third embodiment is more complex in structure than the electrostatic actuator according to the second embodiment. Nonetheless, it can output a trigger signal on detecting an approach of the movable member at high precision.

Fourth Embodiment of the Electrostatic Actuator

The fourth embodiment will be described. In the second embodiment, the change in the charge induced as the movable member 2 approaches is detected. The fourth embodiment differs only in that a contact between the movable member 2 and a detection electrode is detected. Therefore, the components identical in function to those of the second embodiment are designated at like reference numerals and will not be described in detail.

FIG. 34A is a diagram showing the fourth embodiment of the electrostatic actuator. FIG. 34B is a plan view showing the structure of the fourth embodiment of the electrostatic actuator.

This electrostatic actuator has two detection electrodes 50 and an electrical conductor 51. The detection electrodes 50 are arranged on the fixed member 1, at a position that corresponds to the initial position. The electrical conductor 51 is arranged on the movable member 2, facing the detection electrodes 50. A direct-current source 53 keeps applying a voltage to the detection electrodes 50. When the movable member 2 moves and the conductor 51 provided on it contacts the two electrodes, a current flows from one electrode to the other. This event is detected by a monitor circuit 52.

The monitor circuit 52 comprises an amplifier 52b and a decision circuit 52c. The amplifier 52b amplifies the voltage applied from the direct-current source 53. The decision circuit 52c compares the output of the amplifier 52b with a predetermined threshold value. When the conductor 51 provided on the movable member 2 contacts the detection electrodes 50, a closed loop circuit is constituted. As a result, the decision circuit 52c detects the voltage generated in the amplifier 52b, outputting a trigger signal to the pulse-generating circuit 12.

The initialization of the fourth embodiment of the electrostatic actuator is identical to that of the second embodiment shown in FIG. 32. Therefore, the initialization will not be described in detail.

In the fourth embodiment, the electric contacts are used to detect that the movable member 2 contacts them. This direct contact is reliably detected, whereby a detection output can be reliably obtained.

The present invention is not limited to the embodiments described above. Various changes and modifications can be made, without departing from the scope or spirit of the invention. The components used in the embodiments described above may be combined in any appropriate way to make various inventions. For example, some components of any embodiment described above are not used. The components of the different embodiments may be combined, if desired.

The present invention can be broadly utilized in the industry of manufacturing an electrostatic actuator that uses an electret as movable member, a shutter device that has the electrostatic actuator, an imaging module that has the shutter device, and a camera that has the shutter device.

What is claimed is:

1. A shutter device, which adjusts incident light in amount, comprising:
    a first fixed member and a second fixed member, each having a plurality of electrodes arranged on a surface;
    a first light-transmitting region and a second light-transmitting region, which are provided in the first fixed member and the second fixed member, respectively;
    a first light-shielding member and a second light-shielding member, each having a plurality of electret parts, the first light-shielding member being able to move between two positions where the first light-transmitting region is closed and opened, respectively, and the second light-shielding member being able to move between two positions where the second light-transmitting region is closed and opened, respectively; and
    a drive circuit which periodically applies a voltage to the electrodes provided on the first and second fixed members, thereby to generate an electrostatic force acting on the electret parts of the first light-shielding member and an electrostatic force acting on the electret parts of the second light-shielding member and to drive the first and second light-shielding members independently.

2. The shutter device according to claim 1, having a protective member which is so arranged that the first light-shielding member lies between the first fixed member and the protective member.

3. The shutter device according to claim 1, wherein the first and second light-shielding members are light-shielding films.

4. The shutter device according to claim 1, wherein the drive circuit applies a predetermined multi-phase AC voltage to the electrodes provided on the first and second fixed members.

5. The shutter device according to claim 4, wherein the drive circuit includes a pulse-generating circuit which outputs a continuous pulse signal and a conversion circuit which converts the pulse signal to the multi-phase voltage.

6. The shutter device according to claim 5, wherein the drive circuit outputs a strobe control signal when the number of pulses forming the pulse signal increases to a predetermined value.

* * * * *